US012634318B2

(12) United States Patent
    Bjarnason et al.

(10) Patent No.: US 12,634,318 B2
(45) Date of Patent: May 19, 2026

(54) SYSTEMS AND METHODS FOR SPOOFED NETWORK TRAFFIC DETECTION

(71) Applicant: NetScout Systems, Inc., Westford, MA (US)

(72) Inventors: Steinthor Bjarnason, Fjerdingby (NO); Roman Lara, San Antonio, TX (US); Scott Lekel-Johnson, Ann Arbor, MI (US); Max Resing, Westford, MA (US)

(73) Assignee: NetScout Systems, Inc., Westford, MA (US)

( * ) Notice: Subject to any disclaimer, the term of this patent is extended or adjusted under 35 U.S.C. 154(b) by 14 days.

(21) Appl. No.: 18/830,386

(22) Filed: Sep. 10, 2024

(65) Prior Publication Data

US 2026/0075072 A1      Mar. 12, 2026

(51) Int. Cl.
H04L 9/40 (2022.01)

(52) U.S. Cl.
CPC ...... H04L 63/1425 (2013.01); H04L 63/1466 (2013.01); H04L 63/1483 (2013.01)

(58) Field of Classification Search
None
See application file for complete search history.

(56) References Cited

U.S. PATENT DOCUMENTS

| | | | | |
|---|---|---|---|---|
| 9,413,616 B2 * | 8/2016 | Nguyen | ............. | H04L 63/1483 |
| 2005/0018618 A1 * | 1/2005 | Mualem | ............. | H04L 63/1458 |
| | | | | 709/224 |

| | | | | |
|---|---|---|---|---|
| 2005/0180421 A1 * | 8/2005 | Shimada | ............. | H04L 63/1466 |
| | | | | 370/389 |
| 2007/0044142 A1 * | 2/2007 | Yoon | ................... | H04L 63/1458 |
| | | | | 726/3 |
| 2008/0082662 A1 * | 4/2008 | Dandliker | ............... | H04L 63/10 |
| | | | | 709/225 |
| 2009/0122784 A1 * | 5/2009 | Lei | ...................... | H04L 63/1441 |
| | | | | 370/351 |
| 2009/0262659 A1 * | 10/2009 | Sturges | ............... | H04L 63/1416 |
| | | | | 370/253 |
| 2014/0269371 A1 * | 9/2014 | Badea | ................. | H04L 43/0858 |
| | | | | 370/252 |

FOREIGN PATENT DOCUMENTS

| | | | | | |
|---|---|---|---|---|---|
| CN | 105577669 B | * | 9/2018 | ......... | H04L 63/1483 |
| JP | H10271154 A | * | 10/1998 | | |

* cited by examiner

*Primary Examiner* — Boris D Grijalva Lobos
(74) *Attorney, Agent, or Firm* — Foley & Lardner LLP

(57) ABSTRACT

Systems and methods for network traffic monitoring are provided. A system may obtain a data packet of a data packet exchange between the server and a network device, extract a time to live (TTL) value and an internet protocol (IP) address of the network device from the data packet, compare the TTL value with a TTL value range or signature determined based on TTL values observed from data packets transmitted across a communications network, determine that the TTL value violates an authentication policy based on the TTL value being outside of the TTL value range or signature, and apply a tag to the IP address of the network device in a database stored memory.

18 Claims, 12 Drawing Sheets

500

505
Obtain a data packet of a data packet exchange

510
Extract a TTL value and an IP address from the data packet

515
Compare the TTL value with a TTL value range

520
Determine that the TTL value violates an authentication policy

525
Apply a tag to the IP address

700

900

905

Detect a plurality of data packet exchanges between a server and a plurality of network devices

910

Operate in an observation mode

915

Change operation from the observation mode to an idle mode

SYSTEMS AND METHODS FOR SPOOFED NETWORK TRAFFIC DETECTION

BACKGROUND

The use of IP address spoofing has, for a long time, allowed attackers to launch both reflected distributed denial of service (DDoS) attacks and spoofed flooding attacks against their targets. The increased use of IP Source Address Validation (SAV) in recent years has made it more difficult to launch these attacks. However, the upswing of so called "Bulletproof hosting" services and the lack of law enforcement interest in some parts of the world in blocking attackers from launching these kinds of attacks will mean that they will never totally go away.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
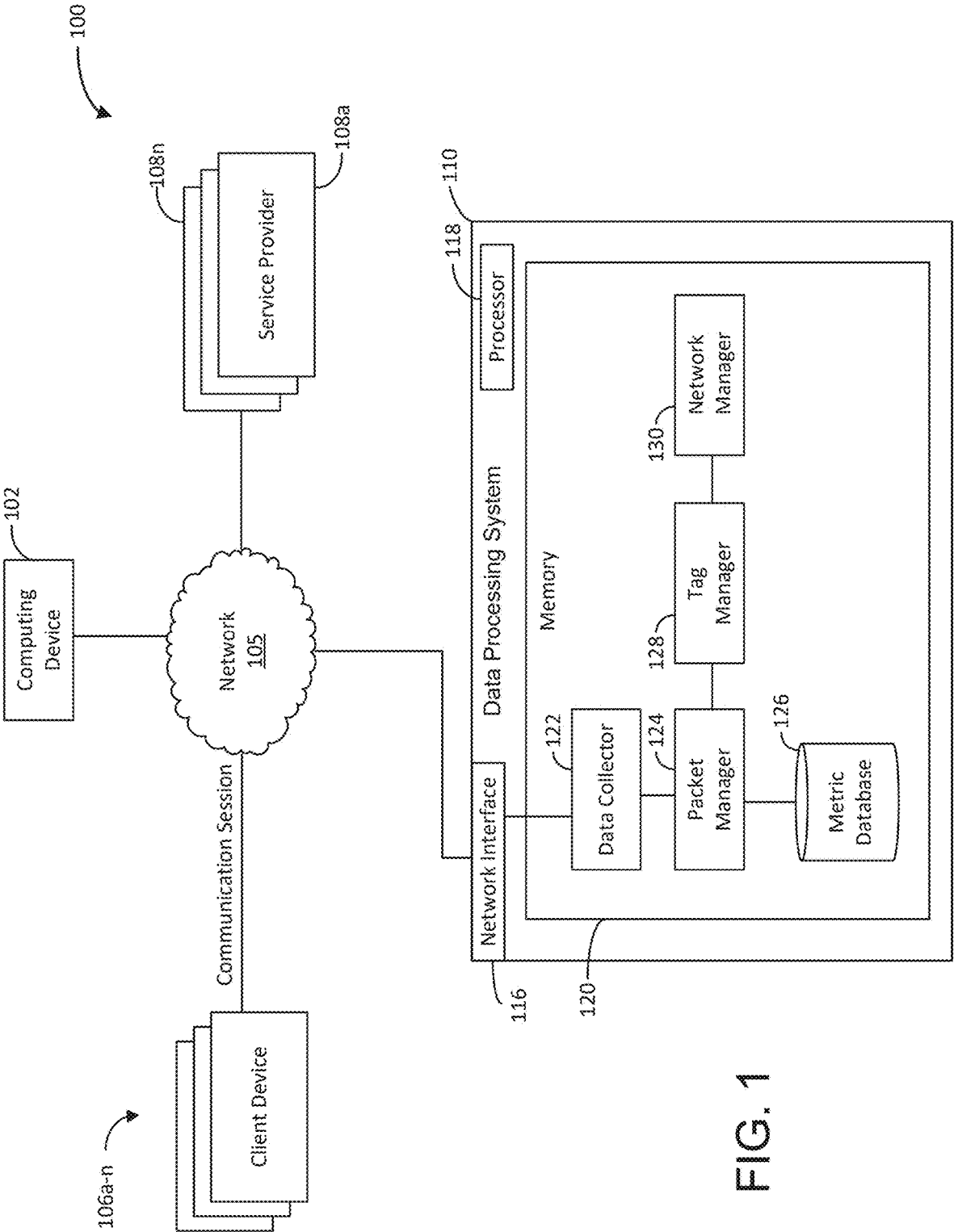
FIG. 1 is an illustration of a system for network attribute analysis, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Some systems may employ various techniques to detect network attacks. For example, a monitoring system can receive data packets and/or contents associated with the data packets. The monitoring system can perform various authentication routines (e.g., TCP authentication, DNS authentication, etc.) to analyze inbound traffic (e.g., data packets). Implementation of these authentication routines can result in legitimate traffic being blocked or diverted. For example, TCP authentication may result in a given percentage of legitimate traffic being blocked by the monitoring system. In instances of a web service that includes upwards of 10,000 active clients, even a rate of blocking legitimate traffic 3% of the time would result in over 300 legitimate clients being blocked from the web service. Proxy authentication may be implemented to reduce the rate of blocking legitimate traffic. However, this form of authentication is computationally complex and time consuming.

The techniques described herein may overcome the aforementioned technical deficiencies. A computer may do so by analyzing inbound network traffic, building up a database of classless inter-domain routing (CIDR) ranges and time to live (TTL) ranges seen during peacetime. In doing so, the computer can generate a CIDR+TTL database containing CIDR blocks and expected TTL ranges for each CIDR block for individual clients. For example, the computer may operate to analyze inbound network traffic to detect information, such as TTL values and internet protocol (IP) addresses associated with various data packets. As an example, the computer may detect an IP address of 192.0.2.52, which may be a part of CIDR block 192.0.2.0/24. In some instances, the CIDR block may be allocated or assigned to a given network or autonomous system. The CIDR blocks may be based on or otherwise tied to geographical locations which may result in regular updating of the CIDR+TTL databases. The computer can generate and/or create a database (e.g., a CIDR database) that includes various ranges for the TTL values observed while monitoring network traffic. For example, the database can include a TTL value range (e.g., ranges of TTL values) for each of a one or more different CIDR blocks. The computer may compare subsequent network traffic with the information stored in the database to monitor for network attacks. For instance, the computer may compare TTL values from inbound network traffic with the TTL value range originating from IP addresses mapped to the CIDR blocks. The computer can authenticate one or more clients responsive to determining the TTL values match or correspond to the TTL value ranges (e.g., determining the TTL values are within the TTL value range) for the corresponding CIDR blocks.

In some embodiments, the TTL values and/or the TTL value ranges may refer to and/or include one or more statistical signatures. For example, the TTL value ranges may include patterns and/or characteristics observed on the network. As another example, the TTL value ranges may be represented by confidence scores and/or correlations between detected TTL values and previously observed and/ or detected TTL values. Stated otherwise, the TTL value ranges may be generated and/or based on statistical pattern recognition.

In some cases, the computer may allow the clients to bypass one more subsequent authentication process responsive to determining if the TTL values match or correspond to the TTL value ranges. The computer may subject one or more clients to subsequent authentication responsive to detecting TTL values that fall outside of the TTL value ranges. For example, the computer may subject a client to TCP authentication responsive to the client having a TTL value that is outside of the TTL value range (e.g., a TTL value that was not previously observed). The computer may initiate countermeasures for client devices that fail the authentication, such as by blocking, rate limiting, bandwidth throttling, and/or deprioritizing network traffic to and/or from such a client device.

The technology described herein may be used in various implementations. For example, instead of or in addition to initiating countermeasures, the computer may generate an early warning type alert when there is a large shift in the TTL ranges of a particular CIDR block. In another example, the technology may be used as a passive user datagram protocol (UDP) type Authentication for protocols like session initiation protocol (SIP) which do not have any kind of authentication methods built in.

There are two approaches to building the database as described herein. In a first approach, the computer may monitor or observe the establishment phase of client connections. For example, the computer may observe the establishment of connections between a server and one or more clients. The computer can generate or store a database with TTL value ranges based on information obtained within observing the establishment phase. For example, the computer can store a TTL value associated with each client that successfully established a connection with a server. The computer can continue to update or reinforce the database with subsequent information that is obtained while monitoring client connections. The computer can also prevent blocking legitimate client traffic by reserving TCP authentication to new clients (e.g., clients previously unobserved on the network).

In a second approach, the computer may monitor communications between clients and servers to observe the establishment of connections. For example, the computer may monitor data packet exchanges to observe when a connection between the client and the server is established. The computer may generate a database that includes TTL ranges or CIDR ranges using information associated with successful connections between the clients and servers. For example, the computer may extract information from one or more data packets associated with successful connections. The extracted information may include information such as an IP address or a TTL value. The computer may generate or update the database to include the extracted information. For example, with each successful connection between a client and a server, the computer may store information associated with the successful connection in the database.

Some technical advantages of the present disclosure include prevention of over-blocking or false positive network attacks (e.g., legitimate network traffic identified as malicious) using a database that includes information that represents successful communications between client and server. The computer may implement the database to reduce TCP authentication to new connections or never seen before connections. For example, the computer may allow traffic to continue between a client having a previously observed TTL value and the server. Conversely, the computer may scrutinize or examine further clients that have unobserved TTL values (e.g., TTL values outside of the TTL value range stored in the database).

FIG. 1 is an illustration of a system 100 for network attribute analysis, in accordance with an implementation. The system 100 may enable detection of DDoS attacks by detecting variances, differences, and/or discrepancies between detected TTL values and information stored in one or more databases. In brief overview, the system 100 can include, access, or otherwise interface with one or more of a data processing system 110 (e.g., a probe, an inspection device), that receives and/or stores data packets transmitted via a network 105 between client devices 106a-n (hereinafter client device 106 or client devices 106) and service providers 108a-n. The service providers 108 can each include a set of one or more servers 1002, depicted in FIG. 10A, or a data center 1008. The client device 106 may be an example of a user equipment (UE) or another device that can access the network 105. The client device 106 can communicate with the service providers 108 to access a service (e.g., a website, an application, etc.). The client device 106, the service provider 108, and the data processing system 110 can communicate or interface with via the network 105 or directly.

Each of the computing device 102, the client devices 106, the service providers 108, and/or the data processing system 110 can include or utilize at least one processing unit or other logic device such as programmable logic array engine, or module configured to communicate with one another or other resources or databases. The components of the computing device 102, the client devices 106, the service providers 108, and/or the data processing system 110 can be separate components or a single component. In some embodiments, the data processing system 110 may be an intermediary device between the client devices 106 and the service providers 108. In some embodiments, the computing device 102 may be an external device (e.g., a security device, a monitoring device, etc.). In some embodiments, the computing device 102, the service provider 108, the data processing system 110, or any combination thereof, may share at least some components or be the same device. The system 100 and its components can include hardware elements, such as one or more processors, logic devices, or circuits.

The computing device 102, the client devices 106, the service providers 108, and/or the data processing system 110 can include or execute on one or more processors or computing devices (e.g., the computing device 1003 depicted in FIG. 10C) and/or communicate via the network 105. The network 105 can include computer networks such as the Internet, local, wide, metro, or other area networks, intranets, satellite networks, and other communication networks such as voice or data mobile telephone networks. Via the network 105, the client device 106 can access information resources such as web pages, web sites, domain names, or uniform resource locators that can be presented, output, rendered, or displayed on at least one computing device (e.g., client device 106), such as a laptop, desktop, tablet, personal digital assistant, smart phone, portable computers, or speaker. For example, via the network 105, the client devices 106 can communicate with the servers of the service providers 108 for data (e.g., a communication session including requests from the client devices 106 and responses from the service providers 108).

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), universal mobile telecommunications system ("UMTS"), 3G, 4G, long term evolution wireless broadband communication ("LTE"), 5G, etc. Different types of data may be transmitted via different protocols, or the same types of data may be transmitted via different protocols. In some embodiments, the network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

The service provider 108 can be a service provider that hosts different services or applications that can be accessed by computing devices, such as the computing device 102 and/or the client devices 106. The service provider 108 can be hosted by a third-party cloud service provider via a virtual environment, in some embodiments. The service provider 108 can be hosted in a public cloud, a co-location facility, or a private cloud, for example. The service provider 108 can be hosted in a private data center, or on one or more physical servers, virtual machines, or containers of an entity or customer. The service providers 108 may each be or include servers or computers configured to transmit or provide services across the network 105 to the client devices 106. The service providers 108 may transmit or provide such services upon receiving requests for the services from any of the client devices 106. The term "service" as used herein includes the supplying or providing of information over a network and is also referred to as a communications network service. Examples of services include 5G broadband services, any voice, data, or video service provided over a network, smart-grid network, digital telephone service, cellular service, Internet protocol television (IPTV), etc. The service may further include a SaaS application, such as a word processing application, spreadsheet application, presentation application, electronic message application, file storage system, productivity application, or any other SaaS application. The service provider 108 can be hosted or refer to cloud 1010 depicted in FIG. 10B.

The client device 106 can establish communication sessions with the service providers 108 to receive data from the service providers 108. For example, a user associated with the client device 106 may request a service. Responsive to the request, a service provider 108 associated with the service may send requested data to the client device 106 in a communication session. In some cases, the request may be a bad request. For example, the request may be a nonexistent DNS query. The client devices 106 may establish communication sessions with the service providers 108 for any type of application or for any type of call.

The client device 106 can be located or deployed at any geographic location in the network environment depicted in FIG. 1. The client device 106 can be deployed, for example, at a geographic location where a typical user using the client device 106 would seek to connect to a network (e.g., access a browser or another application that requires communication across a network). For example, a user can use a client device 106 to access the Internet at home, as a passenger in a car, while riding a bus, in the park, at work, while eating at a restaurant, or in any other environment. The client device 106 can be deployed at a separate site, such as an availability zone managed by a public cloud provider (e.g., a cloud 1010 depicted in FIG. 10B). If the client device 106 is deployed in a cloud 1010, the client device 106 can include or be referred to as a virtual client device or virtual machine. In the event the client device 106 is deployed in a cloud 1010, the packets exchanged between the client device 106 and the service providers 108 can still be retrieved by the data processing system 110 from the network 105. The computing device 102 may be similar to client devices 106. In some cases, the client devices 106 and/or the data processing system 110 can be deployed in the cloud 1010 on the same computing host in an infrastructure 1016 (described below with respect to FIG. 10B).

The data processing system 110 may comprise one or more processors that are configured to obtain network data packets from the service providers 108 during a communication session between the client device 106 and the service providers 108. In some embodiments, the data processing system 110 may refer to and/or include a network monitoring device. The data processing system 110 may comprise a network interface 116, a processor 118, and/or memory 120. The data processing system 110 may communicate with any of the computing device 102, the client devices 106, and/or the service providers 108 via the network interface 116. The processor 118 may be or include an ASIC, one or more FPGAs, a DSP, circuits containing one or more processing components, circuitry for supporting a microprocessor, a group of processing components, or other suitable electronic processing components. In some embodiments, the processor 118 may execute computer code or modules (e.g., executable code, object code, source code, script code, machine code, etc.) stored in the memory 120 to facilitate the operations described herein. The memory 120 may be any volatile or non-volatile computer-readable storage medium capable of storing data or computer code.

The memory 120 may include one or more of a data collector 122, a packet manager 124, a metric database 126, a tag manager 128, and/or a network manager 130. The data processing system 110 may further include other components, managers, handlers, etc. to perform the techniques as described herein. In brief overview, the components 122-130 may obtain a network data packet associated with a communication session between the client device 106 and a network service provider (e.g., the service providers 108). The components 122-130 may determine whether the network data packet includes characteristics indicative of a spoofed IP address.

The data collector 122 may comprise programmable instructions that, upon execution, cause the processor 118 to monitor one or more data packet exchanges. For example, the data collector 122 may monitor exchanges between the client device 106 and the service provider 108. In some embodiments, the data collector 122 may monitor encrypted data packet exchanges. For example, the data collector 122 may monitor encrypted data packet exchanges between one or more clients and a server. In some embodiments, a client may refer to a computer with a first IP address that initiates a session (e.g., a flow, communication, exchange, etc.) with a second computer having a second IP address.

The data collector 122 may obtain (e.g., receive, collect) data transmitted between the client devices 106 and the service providers 108 as part of a communication session. For example, the client device 106 may send a request for a service to the service provider 108. The service provider 108 may send a response to provide the service to the client device 106. The data collector 122 may receive the request from the service provider 108. In some cases, the response may be unencrypted (e.g., clear text traffic). For example, the data collector 122 may obtain the response before an encryption device applies an encryption process to the response. The request may be associated with a normal request for the service, or the request may be associated with a malicious attack. In some embodiments, the data collector 122 may obtain data packet exchanges between the client devices 106 and the service providers 108.

The packet manager 124 may comprise programmable instructions that, upon execution, cause the processor 118 to monitor a plurality of data packet exchanges. For example, the packet manager 124 may monitor data packets or data packet exchanges obtained by the data collector 122. As another example, the packet manager 124 may retrieve, from one or more databases (e.g., the metric database 126), information obtained by the data collector 122. In some embodiments, the data packets, the data packet exchanges, and/or corresponding information may include IP addresses or TTL values. For example, a given data packet exchange between a network device (e.g., the client device 106) and a server (e.g., the service provider 108) may include or otherwise transmit an IP address of the client device 106 and a TTL value associated with the client device 106.

In some embodiments, the packet manager 124 may extract information from the data packet exchanges. For example, the packet manager 124 may extract IP addresses and TTL values from respective data packet exchanges. In some embodiments, the packet manager 124 may compile or otherwise aggregate the IP addresses and the TTL values. For example, the packet manager 124 may store or otherwise keep information that indicates the IP addresses and the TTL values in the metric database 126.

In some embodiments, the packet manager 124 may generate at least one TTL value range. For example, the packet manager 124 may analyze the TTL values, extracted from the data packet exchanges, to detect one or more ranges (e.g., a range of TTL values). As another example, the packet manager 124 may analyze the TTL values to determine various metrics (e.g., average, standard deviation, frequency, minimum, maximum, median, etc.). In some embodiments, the packet manager 124 may generate the TTL value range based on TTL values observed from data packets transmitted across a communications network. For example, the packet manager 124 may determine the TTL value range based on information associated with data packet exchanges transmitted across the network 105.

In some embodiments, the TTL value ranges may represent differences between one or more TTL values. For example, a TTL value range may indicate a difference between a first TTL value and a second TTL value. The first TTL value may represent the largest TTL value observed across the network and the second TTL value may represent the smallest TTL value observed across the network. As an example, the first TTL value may represent a TTL value with the highest number (e.g., lowest number of hops or routers)

and the second TTL value represent a TTL value with the lowest number (e.g., highest number of hops or routers).

In some embodiments, the packet manager 124 may generate or update one or more data structures that represent the TTL values ranges by compiling or storing observed TTL values in the metric database 126. For example, the packet manager 124 may update a data structure, stored in the metric database 126, responsive to detecting a new TTL value. As another example, the packet manager 124 may update the TTL value ranges responsive to detecting a TTL value outside of the TTL value ranges. In some embodiments, the packet manager 124 may continuously, semi-continuously, and/or sequentially update the metric database 126 to reflect observed TTL values. For example, the packet manager 124 may extract TTL values from one or more data packets observed during a given time window. As another example, the packet manager 124 may extract TTL values from one or more data packets as the data packets are obtained by the data collector 122.

In some embodiments, the packet manager 124 may update or supplement the metric database 126 for a given amount of time. For example, the packet manager 124 may continuously update the metric database 126 by adding TTL values to the metric database 126 prior to detection of a network attack. As another example, the packet manager 124 may continuously update the metric database 126 by adjusting the TTL value range for a predetermined amount of time (e.g., every fifteen minutes, every hour, every day, etc.).

In some embodiments, the packet manager 124 may obtain at least one data packet exchange. For example, the packet manager 124 may obtain data packet exchanges subsequent to generating the TTL value ranges. As another example, the packet manager 124 may obtain the data packet exchanges responsive to compiling information, for a predetermined amount of time, in the metric database 126. In some embodiments, the packet manager 124 may continuously or semi-continuously obtain data packets. For example, the packet manager 124 may obtain first data packet exchanges, for a first amount of time, to update the metric database 126 based on the first packet exchanges. As another example, the packet manager 124 may obtain second data packet exchanges, for a second amount of time, to compare with the information stored in the metric database 126 (e.g., TTL values, TTL value ranges, etc.).

In some embodiments, the packet manager 124 may compare TTL values with the TTL value range. For example, the packet manager 124 may extract a TTL value from a given data packet exchange. The packet manager 124 may compare the extracted TTL value with one or more TTL value ranges stored in the metric database 126. As another example, the packet manager 124 may query the metric database 126 to search for a match between an extracted TTL value and one or more previously observed TTL values (e.g., TTL values or TTL value range stored in the metric database 126).

In some embodiments, the packet manager 124 may determine that one or more TTL values violate at least one authentication policy. For example, an authentication policy may define or dictate variances between TTL values and the TTL value ranges (e.g., thresholds between TTL values and the TTL value ranges). As another example, an authentication policy may define that the authentication policy is violated when a TTL value is outside of (e.g., not included within) the TTL value range. In some embodiments, the packet manager 124 may determine that the TTL values violate the authentication policies based on the TTL values being outside of the TTL value range. For example, the TTL value range may include a highest TTL value and a lowest TTL value. The packet manager 124 may determine that TTL values violate the authentication policy based on the TTL values being larger than the highest TTL value or lower than the lowest TTL value. As another example, the TTL value range may include a standard deviation or variance that defines given TTL values that may satisfy the authentication policy. Stated otherwise, the TTL value range may include an average value (e.g., average TTL value) and the standard deviation may define a range or distance between TTL values and the average value.

In some embodiments, the packet manager 124 may retrieve one or more mappings. For example, the packet manager 124 may retrieve a mapping that includes a list of IP addresses associated with the network 105. As another example, the packet manager 124 may retrieve a mapping that indicates a list of classless inter-domain routing (CIDR) blocks. In some embodiments, the packet manager 124 may generate the mapping to indicate a mapping of IP addresses to the CIDR blocks. For example, the CIDR blocks may each include and/or indicate one or more IP addresses associated with the network 105. The packet manager 124 may generate the mapping by adding or storing information associated with the CIDR blocks in the metric database 126.

In some embodiments, the packet manager 124 may retrieve the mappings from the metric database 126. For example, the packet manager 124 may transmit one or more application programming interface (API) calls to the packet manager 124 to retrieve the CIDR blocks. As another example, the packet manager 124 may retrieve the CIDR blocks from one or more publicly accessible databases or resources.

In some embodiments, the packet manager 124 may retrieve or obtain various mapping databases. For example, the packet manager 124 may download a list that maps IP addresses to one or more classless CIDR blocks. The packet manager 124 may obtain the lists from various data sources or collection of information. For example, the packet manager 124 may obtain archives of data such as, by using multi-threaded routing toolkit (MRT) and/or routing information base (RIB) to obtain border gateway protocol (BGP) data. In some embodiments, the packet manager 124 may convert the BGP data into various pairs. For example, the computer can convert the BGP data into autonomous system number (ASN) and CIDR pairs. As another example, the packet manager 124 may perform local queries of the CIDR database using a threat mitigation system (TMS) or other possible security application. Stated otherwise, the packet manager 124 may implement one or more in-memory lookups.

In some embodiments, the packet manager 124 may retrieve the mappings responsive to extraction of one or more IP addresses. For example, the packet manager 124 may retrieve the mappings to compare known IP addresses of the network 105 with an IP address extracted from a data packet exchange. As another example, the packet manager 124 may retrieve the mappings responsive to receiving, from the data collector 122, data packet exchanges and/or information associated with the data packet exchanges. The packet manager 124 can identify a CIDR block that corresponds to the IP address based on the mapping (e.g., identify the CIDR that is mapped to the IP address of the data packet).

In some embodiments, the packet manager 124 may detect that one or more IP addresses do not map to the CIDR blocks. For example, the packet manager 124 may detect that an extracted IP address is not associated with the network 105 (e.g., not included in and/or associated with any CIDR block of the list of CIDR blocks). As another example, the packet manager 124 may detect that an IP address associated with a data packet exchange does not match known IP addresses for the network 105. Stated otherwise, the packet manager 124 may detect that an IP address, extracted from a data packet exchange, does not match IP addresses associated with the network 105.

In some embodiments, the packet manager 124 may detect that an IP address is included in the mapping. For example, the packet manager 124 may find a match between an extracted IP address and an IP address associated with a CIDR block of the list of CIDR blocks. As another example, the packet manager 124 may find a match responsive to querying the list of mappings. In some embodiments, the list of CIDR blocks may be stored as one or more vectors in the metric database 126. For example, the packet manager 124 may store each CIDR block included in the list of CIDR blocks as vector embeddings in the metric database 126.

In some embodiments, the packet manager 124 may compare TTL values with the TTL value range responsive to determining that extracted IP addresses are included a CIDR block of the list of CIDR blocks. For example, the packet manager 124 may extract an IP address and a TTL value from a data packet exchange. The packet manager 124 may compare the TTL value with the TTL value range associated with a CIDR block that includes the extracted IP address. Stated otherwise, the packet manager 124 compares TTL values associated with IP addresses that are included in the list of CIDR blocks.

In some embodiments, the packet manager 124 may authenticate one or more network devices. For example, the packet manager 124 may authenticate a given client device 106 based on an IP address and a TTL value extracted from a data packet exchange of the given client device 106. As another example, the packet manager 124 may authenticate a given client device 106 using the list of CIDR blocks and the TTL value range associated with each CIDR block. The packet manager 124 may compare the IP address with the list of CIDR blocks to check for a match. The packet manager 124 may compare, responsive to a match between the IP address and the list of CIDR blocks, the TTL value with the TTL value range of a CIDR block that includes the IP address. In some embodiments, the packet manager 124 may authenticate a network device based on a determination that an IP address, of the network device, is included in the list of CIDR blocks. The packet manager 124 may authenticate the network device based on a determination that a TTL value, of the network device, is included in the TTL value range.

In some embodiments, the packet manager 124 may determine that a network device is an authenticated network device. For example, the packet manager 124 may store or apply one or more flags in the metric database 126 to indicate network devices authenticated by the packet manager 124. The packet manager 124 may determine that a network device is an authenticated network device responsive to detecting that the network device was indicated as authenticated in the metric database 126. In some embodiments, the packet manager 124 may apply a flag to a network device responsive to a determination that an IP address of the network device is included in the list of CIDR blocks (e.g., is included in a list of IP addresses mapped to a particular CIDR block). The packet manager 124 may apply a flag to a network device responsive to a determination that a TTL value of the network device is included in the TTL value range. In some embodiments, the packet manager 124 may store IP addresses associated with authenticated devices as a data structure in the metric database 126.

In some embodiments, the packet manager 124 may determine that a network device is an authenticated network device responsive to an IP address of the network device matching an IP address stored in the data structure that includes authenticated network devices. In some embodiments, the packet manager 124 may prevent a retrieval of the list of CIDR blocks responsive to determining that the network device is an authenticated network device. For example, the packet manager 124 may retrieve the list of CIDR blocks responsive to determining that a network device was not previously authenticated. Stated otherwise, the packet manager 124 may prevent retrieval of information responsive to determining that the network device was previously authenticated. In this way, the packet manager 124 can avoid using processing power for redundant authentication of the same network device after already determining that the network device has already been authenticated.

The tag manager 128 may comprise programmable instructions that, upon execution, cause the processor 118 to apply one or more tags to network devices. In some embodiments, the tag manager 128 may apply one or more tags to network devices by updating or storing a flag, in a database (e.g., the metric database 126), that indicates that the one or more network devices (e.g., IP addresses of the one or more network devices) have been tagged. For example, the tag manager 128 may apply tags to a given client device 106 by updating a status of the given client device 106 in the database. In some embodiments, the tag manager 128 may apply tags to IP addresses based on TTL values. For example, the tag manager 128 may apply a tag to a given IP address based on a TTL value associated with the given IP address. The tag manager 128 may apply a tag to the given IP address responsive to the packet manager 124 determining that the TTL value violates an authentication policy. For example, the tag manager 128 may apply tags to one or more IP addresses associated with TTL values that are not included in the TTL value range.

In some embodiments, the tag manager 128 may apply a tag to a given IP address responsive to the packet manager 124 determining that the given IP address does not map to any CIDR block of the list of CIDR blocks. For example, the packet manager 124 may transmit one or more signals to the tag manager 128 to identify given IP addresses. The tag manager 128 may apply the tags to the given IP addresses responsive to receipt of the one or more signals. As another example, the packet manager 124 may update or add given IP addresses into a queue or cache. The tag manager 128 may apply tags to the given IP addresses added to the queue. In some embodiments, the tag manager 128 may apply tags to IP addresses to identify the IP addresses as suspicious.

In some embodiments, the network manager 130 may comprise programmable instructions that, upon execution, cause the processor 118 to execute one or more authentication routines. For example, the network manager 130 may execute a TCP authentication routine on one or more network devices associated with IP addresses tagged by the tag manager 128. As another example, the network manager 130 may execute a DNS authentication routine on network devices identified as suspicious. In some embodiments, the network manager 130 may execute the authentication routines responsive to application of tags by the tag manager 128. For example, the network manager 130 may be notified when a given IP address is tagged by the tag manager 128. The network manager 130 may perform one or more of the authentication routines responsive to the notification by the tag manager 18 or responsive to the tags.

The network manager 130 can adjust tags on IP addresses based on the authentication routines. For example, the network manager 130 can determine a tagged IP address failed at least one of or each of the authentication routines applied to the IP address. Responsive to doing so, the network manager 130 can change the tag on the IP address from suspicious to indicate the IP address is malicious or a known attacker. In another example, the network manager 130 can determine the tagged IP address was authenticated in at least one of or in each of the authentication routines, the network manager 130 can remove the tag from the IP address.

The network manager 130 can mitigate network attacks. The network manager 130 can do so based on the tags and/or the authentication routines as described above. For example, responsive to identifying an IP address that has been tagged (e.g., by a suspicious tag or a malicious tag), the network manager 130 can block, throttle, or otherwise reduce network traffic originating from or directed to the IP address or transmit a message to a device of the network 105 that controls or facilitates network traffic across the network 105 that causes the device to similarly mitigate network traffic originating from or directed to the IP address. In another example, the network manager 130 can perform one or more authentication routines on a tagged IP address and determine one or each of the authentication routines fails for the IP address. Responsive to the determination, the network manager 130 can determine the IP address is malicious (e.g., a data packet included a spoofed IP packet header) and mitigate network traffic originating from or directed to the IP address as described above.

In some embodiments, the packet manager 124 may detect one or more data packet exchanges between the client devices 106 and the service provider 108. For example, the packet manager 124 may detect the data packet exchanges responsive to observing the establishment phase of one or more client connections. The packet manager 124 may observe the establishment phase of the one or more client connections by tracking handshakes between the client devices 106 and the service provider 108.

In some embodiments, the packet manager 124 may operate in one or more modes. For example, the packet manager 124 may perform one or more first operations while operating in a first mode. As another example, the packet manager 124 may perform one or more second operations while operating in a second mode. In some embodiments, the packet manager 124 may operate in at least one of an observation mode, an idle mode, and/or a mitigation mode.

In some embodiments, the packet manager 124 may extract one or more TTL values that correspond to data packet exchanges. For example, the packet manager 124 may extract TTL values from information that corresponds to the data packet exchanges. As another example, the packet manager 124 may perform data scraping to extract the TTL values from the data packet exchanges. In some embodiments, the packet manager 124 may extract the TTL values while operating in the observation mode. For example, a given operation of the observation mode may include the packet manager 124 extracting TTL values.

In some embodiments, that packet manager 124 may store information that represents the TTL values in a data structure. For example, the packet manager 124 may store the TTL values in the metric database 126 as a data structure. As another example, the packet manager 124 may generate a data model to represent the TTL values. In some embodiments, the packet manager 124 may store the information that represents the TTL values while operating in the observation mode. For example, a given operation of the observation mode may include the packet manager 124 storing the information that represents the TTL values.

In some embodiments, the packet manager 124 may change from a first operation to a second operation. For example, the packet manager 124 may change operation from the observation to the idle mode. As another example, the packet manager 124 may change from performing one or more first operations to performing one or more second operations. In some embodiments, the packet manager 124 may change based on a condition of the network 105. For example, the packet manager 124 may change operation from the observation mode to the idle mode responsive to a determination that a network characteristic of the network 105 satisfies a condition.

In some embodiments, the packet manager 124 may determine that a network characteristic of the network 105 satisfies a condition based on an elapsed amount of time. For example, the packet manager 124 may determine that the condition is satisfied responsive to having operated in the observation mode for 1 hour. As another example, the packet manager 124 may determine that the condition is satisfied responsive to packet manager 124 obtaining a given amount of data packet exchanges.

In some embodiments, the packet manager 124 may compile or aggregate information collected while operating in the observation mode. For example, the packet manager 124 may continuously or semi-continuously update the metric database 126 as the packet manager 124 receives information. As another example, the packet manager 124 may update a data structure to reflect each extracted TTL value or extracted IP address while operating in observation mode. In some embodiments, the packet manager 124 may transmit the information to the computing device 102. For example, the packet manager 124 may transmit the information via one or more signals. In some embodiments, the packet manager 124 may transmit the TTL value ranges and/or the CIDR blocks to the computing device 102.

In some embodiments, the computing device 102 may monitor subsequent communication across the network 105 based on the information transmitted by the packet manager 124. For example, the computing device 102 may compare observed TTL values with the TTL value range transmitted by the packet manager 124. As another example, the computing device 102 may monitor the network 105 to detect one or more IP addresses tagged by the tag manager 128.

In some embodiments, the packet manager 124 may prevent storage of information while operating in the idle mode. For example, the packet manager 124 may, while operating in the idle mode, no longer store information in the metric database 126. As another example, the packet manager 124 may halt extraction of TTL values while operating in the idle mode. In some embodiments, the packet manager 124 may change operation from the observation mode to the idle mode to prevent subsequent updating of the metric database 126.

In some embodiments, the packet manager 124 may generate an access control list based on TTL values and IP addresses. For example, the packet manager 124 may generate an access control list that controls which devices may communicate over the network 105. As another example, the packet manager 124 may generate an access control list that includes a range of expected or predicted TTL values. In some embodiments, the access control list may include one or more combinations or variations of IP addresses and TTL values. For example, the access control list may include one or more CIDR blocks associated with the network 105 (e.g., CIDR blocks of the list of CIDR blocks). The list of CIDR blocks can be linked or paired to one or more TTL values. Stated otherwise, an observed TTL value may be linked to a CIDR block mapped to an IP address that transmitted the data packet from which the observed TTL value was extracted.

In some embodiments, the packet manager 124 may identify a mobile device as malicious based on differences between one or more combinations of the access control list and information extracted from a given data packet. For example, the packet manager 124 may extract a TTL value and an IP address from a data packet. The packet manager 124 may compare the TTL value and the IP address with one or more combinations included in the access control list. In some embodiments, the packet manager 124 may identify a mobile device as malicious responsive to determining that the TTL value and the IP address do not match any combination included in the access control list.

Figure 2:
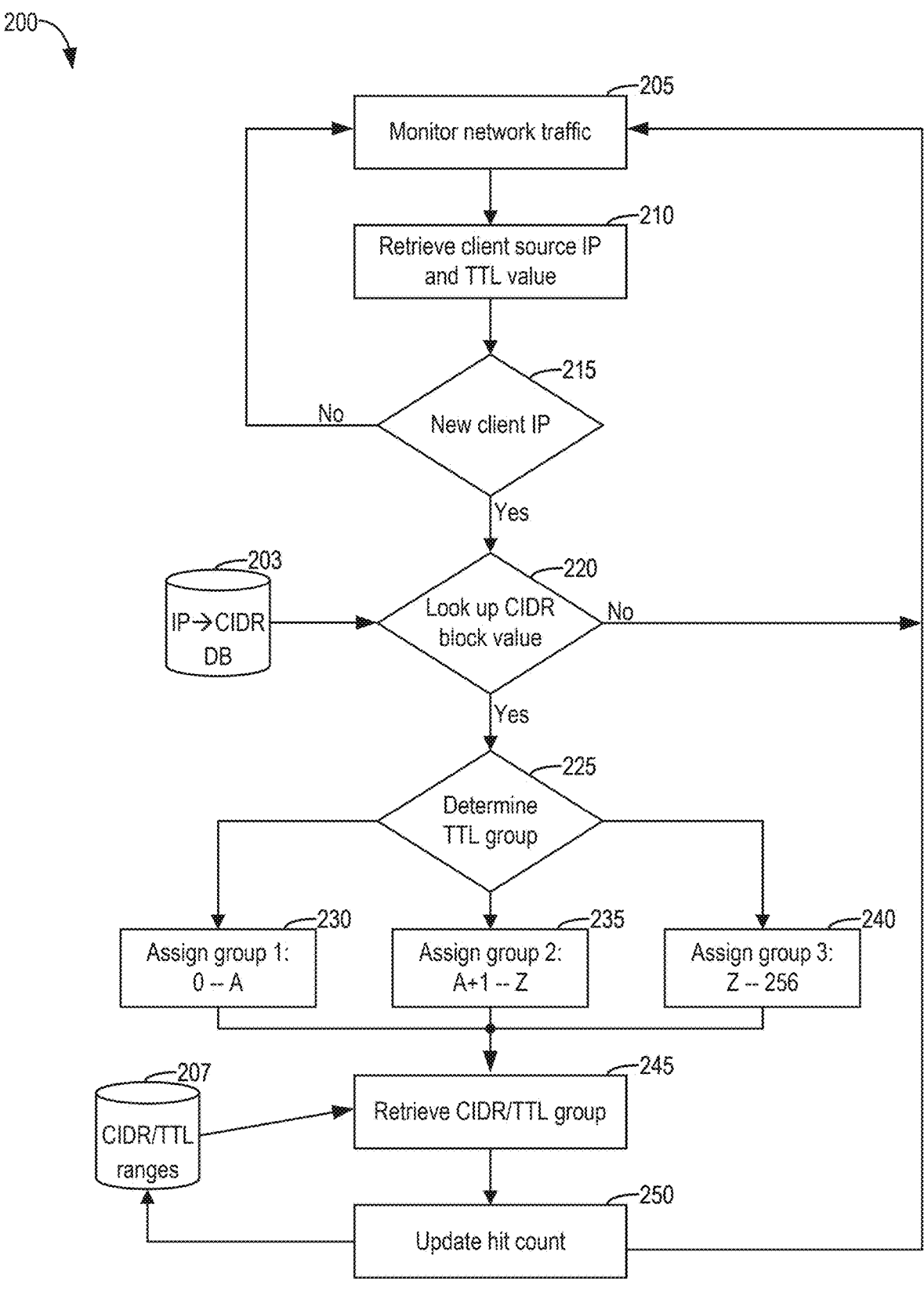
FIG. 2 is an illustration of a flow diagram of a process for spoofed network traffic detection, in accordance with an implementation.

FIG. 2 is an illustration of a flow diagram of a process 200 for spoofed network traffic detection, in accordance with an implementation. The process 200 can be performed by a data processing system (the data processing system 110, shown and described with reference to FIG. 1). The process 200 may include more or fewer operations and the operations may be performed in any order. Performance of the process 200 may enable the data processing system to detect spoofed network traffic. In some embodiments, the process 200 or one or more operations thereof may refer to or include a monitor mode.

At operation 205, the data processing system monitors network traffic. For example, the data processing system may monitor network traffic across the network 105. As another example, the data processing system may monitor network traffic exchanged between the client devices 106 and the service providers 108. In some embodiments, the data processing system may obtain one or more data packet exchanges while monitoring network traffic.

At operation 210, the data processing system retrieves a client source IP address and a TTL value. For example, the data processing system may extract an IP address and a TTL value from one or more data packet exchanges obtained in operation 205. As another example, the data processing system may retrieve the IP address and the TTL value from the metric database 126.

At operation 215, the data processing system determines whether the IP addresses are new. For example, the data processing system may compare the IP addresses retrieved in operation 210 with one or more IP addresses previously observed on the network 105. As another example, the data processing system may query the metric database 126 to determine whether the IP addresses retrieved in operation 210 are new (e.g., previously unobserved). The process 200 may proceed to operation 205 responsive to a determination that the IP addresses are not new. The process 200 may proceed to operation 220 responsive to a determination that the IP addresses are new.

At operation 220, the data processing system determines whether the IP addresses are mapped to a CIDR block. For example, the data processing system may query a CIDR database 203 to determine if the IP addresses retrieved in operation 210 are associated with the network 105 (e.g., included in a CIDR block). In some embodiments, the CIDR database 203 may refer to or include the metric database 126. The process 200 may proceed to operation 205 responsive to a determination that the IP addresses retrieved in operation 210 are not mapped to a CIDR block in the CIDR database 203. The process 200 may proceed to operation 225 responsive to a determination that the IP addresses retrieved in operation 210 are included in the CIDR database 203.

At operation 225, the data processing system determines a given TTL group for the TTL values retrieved in operation 210. For example, the data processing system may determine a TTL group based on a given operating system or computing system (e.g., a network device type) that transmitted the data packets. For example, a computing system may operate a Linux system (e.g., a network device type) that dictates a corresponding TTL group. As another example, a network device type may be a corresponding operating system (e.g., a first given operating system is associated with a first TTL group, a second given operating system is associated with a second TTL group, etc.). The TTL groups may include values decreasing from starting values of 64, 128, and 255, such as based on a client's operating system. Stated otherwise, the TTL values may be organized into three TTL groups (e.g., a first group for TTL values between 1 and 63, a second group of TTL values between 64 and 127, and a third group of TTL values between 128 and 254). In some embodiments, the data processing system determines the given TTL group based on information included in the data packet exchanges obtained in operation 205. For example, the data processing system may determine that a TTL value corresponds to the 64 group (e.g., the first group) based on the TTL value being less than 64. As another example, the data processing system may determine the TTL group based on an operating system associated with a network device that transmitted a given data packet. The process 200 proceeds to operation 230 responsive to a determination that the TTL values pertain to a first group. The process 200 proceeds to operation 235 responsive to a determination that the TTL values pertain to a second group. The process 200 proceeds to operation 240 responsive to a determination that the TTL values pertain to a third group.

At operation 230, the data processing system assigns the TTL values to a first group. For example, the data processing system may apply one or more tags to the TTL values to indicate the TTL values are associated with the first group. As another example, the data processing system may update a data structure associated with the first group to the include the TTL values.

At operation 235, the data processing system assigns the TTL values to a second group. For example, the data processing system may update the metric database 126 to include an indication that the TTL values are associated with the second group. As another example, the data processing system may update a queue associated with the second group to include the TTL values.

At operation 240, the data processing system assigns the TTL values to a third group. For example, the data processing system may update observed TTL values associated with the third group to include the TTL values. As another example, the data processing system may update a data structure maintained in the metric database 126 to include the TTL values.

In some embodiments, the first group, the second group, and third group may refer to or include three groups of expected TTL values. For example, the first group may refer to or include a 64 group (e.g., TTL values that may range from 1-63). As another example, the second group may refer to or include a 128 group (e.g., TTL values that may range from 64-127). As another example, the third group may refer to or include a 255 group (e.g., TTL values that may range from 128-255).

In some embodiments, the data processing system may generate or otherwise build a statistical model that represents the three TTL groups. For example, the data processing system may build a statistical model to represent the 128 group. The statistical model may represent the 128 group by storing or maintaining metrics that corresponds to the 128 group. For example, the statistical model may store a minimum observed TTL value, a maximum TTL value, and a standard deviation. In some embodiments, the statistical model may generate or translate metrics that correspond to the 128 group into a lower bound and an upper bound. Stated otherwise, the statistical model may predict what the lowest observed TTL value may be as well as what the highest observed TTL value may be. In some embodiments, the data processing system may identify suspicious IP addresses based on corresponding TTL value being larger than the upper bound and/or smaller than the lower bound.

At operation 245, the data processing system retrieves CIDR/TTL groups. For example, the data processing system may retrieve the CIDR/TTL groups from the CIDR/TTL ranges database 207. In some embodiments, the CIDR/TTL ranges database 207 may refer to or include the metric database 126. The CIDR/TTL ranges database 207 may include information stored or maintained by the metric database 126. For example, the CIDR/TTL ranges database 207 may include the TTL value ranges.

At operation 250, the data processing system updates a hit count in the CIDR/TTL ranges database 207. For example, the data processing system may update a counter that represents a given TTL value (e.g., how many times has the TTL value been observed). As another example, the data processing system may update a counter that represents a given IP address and TTL Value combinations (e.g., how many times have the IP address and TTL value been included in data packet exchanges). The process 200 may proceed to operation 205 responsive to updating the hit count.

Figure 3:
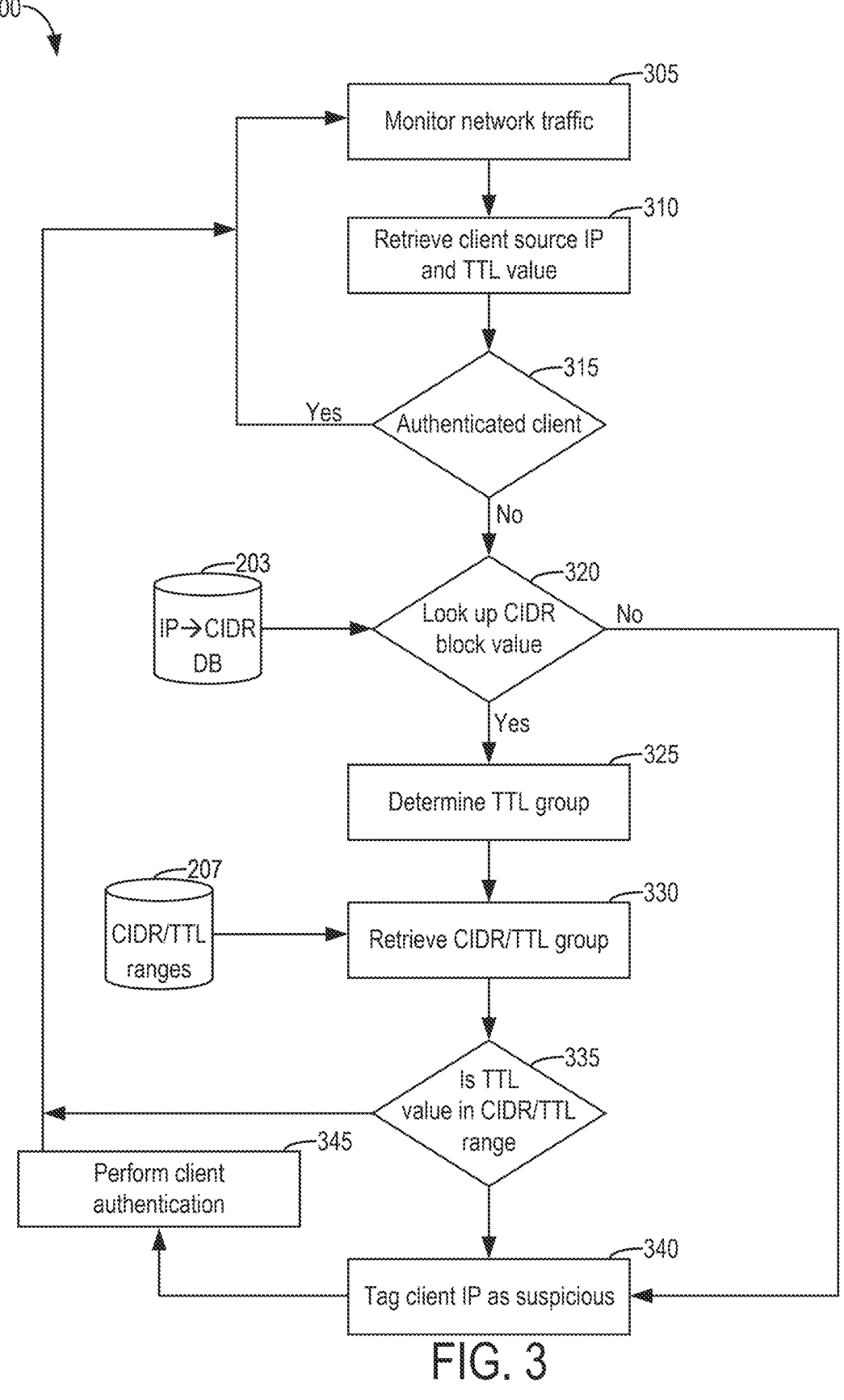
FIG. 3 is an illustration of a flow diagram of a process for spoofed network traffic detection, in accordance with an implementation.

FIG. 3 is an illustration of a flow diagram of a process 300 for spoofed network traffic detection, in accordance with an implementation. The process 300 can be performed by a data processing system (the data processing system 110, shown and described with reference to FIG. 1). The process 300 may include more or fewer operations and the operations may be performed in any order. Performance of the process 300 may enable the data processing system to detect spoofed network traffic. In some embodiments, the process 300 may include one or more operations similar to that of the process 200. In some embodiments, the data processing system may repeat, replicate, or otherwise reproduce the process 300 or one or more operations thereof may while the data processing system is operating in a monitor mode.

At operation 305, the data processing system monitors network traffic. At operation 310, the data processing system retrieves a client source IP address and TTL value. The data processing system may perform operations 305 and 310 in the same or in a similar manner to operations 205 and 210.

At operation 315, the data processing system may determine whether a client is an authenticated client. For example, the data processing system may determine whether an IP address retrieved in operation 310 corresponds to an authenticated client. In some embodiments, the data processing system may determine that the client is an authenticated client based on one or more flags in the metric database 126. For example, clients (e.g., the client devices 106) may have one or more flags set in the metric database 126 to indicated that the clients have been authenticated. The process 300 may return to operation 305 responsive to a determination that the client is an authenticated client. The process 300 may proceed to operation 320 responsive to a determination that the client is not an authenticated client.

At operation 320, the data processing system looks up the CIDR block values from the CIDR database 203 (shown and described with reference to FIG. 2). For example, the data processing system may query the CIDR database 203 to determine if the IP addresses associated with unauthenticated clients are included in the CIDR database 203. As another example, the data processing system may retrieve information from the metric database 126 that indicates the CIDR blocks. The process 300 may proceed to operation 340 responsive to a determination that the IP addresses are not included in the CIDR blocks (e.g., are not mapped to any of the CIDR blocks). The process 300 may proceed to operation 325 responsive to a determination that the IP addresses are included in the CIDR blocks.

At operation 325, the data processing system determines TTL groups for TTL values associated with the IP addresses included in the CIDR blocks. At operation 330, the data processing system retrieves the CIDR/TTL groups based on the TTL groups determined in operation 325. For example, the data processing system may retrieve the CIDR/TTL groups that correspond to group 64 based on the TTL value being less than 64. The data processing system can receive the CIDR/TTL groups from the CIDR/TTL ranges database 207 (shown and described with reference to FIG. 2).

At operation 335, the data processing system determines whether the TTL values are included in the CIDR/TTL ranges. For example, the data processing system may determine if the TTL values are included within the TTL value range. As another example, the data processing system may determine if the TTL value has been previously observed in one or more data packet exchanges. The process 300 returns to operation 305 responsive to a determination that the TTL values are included in the CIDR/TTL ranges. The process 300 proceeds to operation 315 responsive to a determination that the TTL values are absent from the CIDR/TTL ranges.

At operation 340, the data processing systems tags client IP addresses as suspicious. For example, the data processing system may apply tags to the IP addresses associated with TTL values that were absent from the CIDR/TTL ranges. As another example, the data processing system may update the metric database 126 to indicate that the IP addresses are suspicious.

At operation 345, the data processing system performs client authentication. For example, the data processing system may perform client authentication on the IP addresses tag as suspicious in operation 340. In some embodiments, the data processing system may implement TCP authentication or DNS authentication. For example, the data processing system may transmit a message including a TCP header to an IP address tagged as suspicious in operation 340. The process 300 may return to operation 305 responsive to completion of client authentication.

Figure 4:
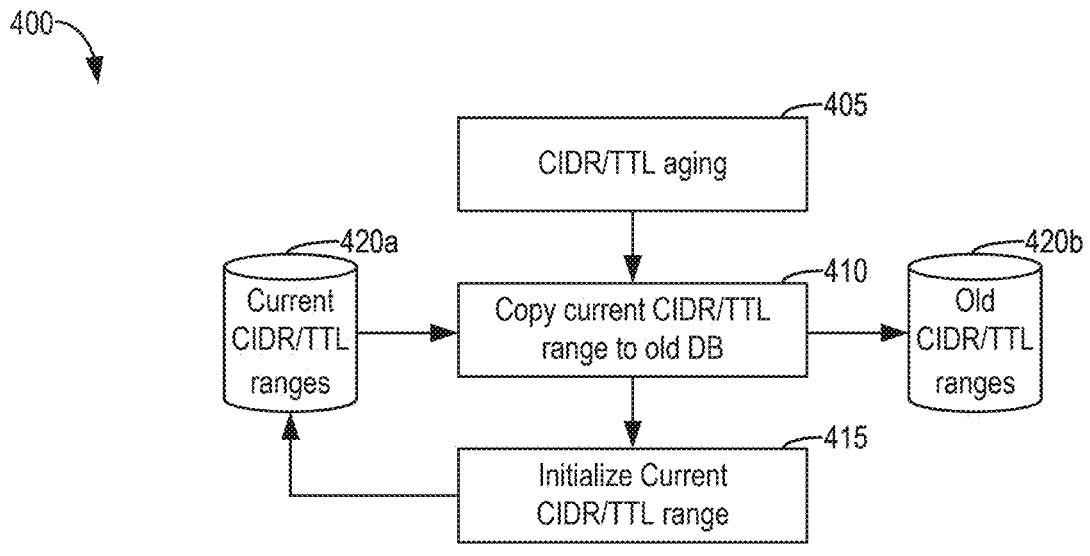
FIG. 4 is an illustration of a flow diagram of a process for spoofed network traffic detection, in accordance with an implementation.

FIG. 4 is an illustration of a flow diagram of a process 400 for spoofed network traffic detection, in accordance with an implementation. The process 400 can be performed by a data processing system (the data processing system 110, shown and described with reference to FIG. 1). The process 400 may include more or fewer operations and the operations may be performed in any order. Performance of the process 400 may enable the data processing system to detect spoofed network traffic. In some embodiments, the data processing system may repeat, replicate, or otherwise reproduce the process 400 or one or more operations thereof may while the data processing system is operating in a monitor mode.

At operation 405, the data processing system detects CIDR/TTL aging. For example, the data processing system may determine an amount of time that has elapsed since one or more data packets were received. The data processing system may determine the amount of time using one or more timestamps that represent when the data packets were received. In some embodiments, the data processing system may detect CIDR/TTL aging based on the amount of time exceeding a given threshold. Stated otherwise, the data processing system may determine that an age of the data packets (e.g., amount of time elapsed since the data packets were received) exceeds a predetermined threshold. For example, the data processing system may determine that the metric database 126 includes information that represents data packets obtained more than an hour ago. As another example, the data processing system may determine that the metric database 126 includes information thar represents data packets obtained more than a day ago.

At operation 410, the data processing system copies current CIDR/TTL range to an old database. For example, the system 100 may include a current CIDR/TTL range database 420a (e.g., a first metric database 126) and an old CIDR/TTL range database 420b (e.g., a second metric database 126). In some embodiments, the data processing system may retrieve or obtain information from the current CIDR/TTL range database 420a. For example, the data processing system may retrieve information that corresponds to old data packet exchanges (e.g., an amount of time elapsed since obtaining the data packet exchanges exceeds threshold). The data processing system may store or otherwise ingest the retrieved information into the old CIDR/TTL range database 420b.

In some embodiments, the data processing system may update a data structure, stored in the old CIDR/TTL range database 420b, to include the information retrieved from the current CIDR/TTL range database 420a. As another example, the data processing system may remove information from the current CIDR/TTL range database 420a and store the information in the old CIDR/TTL range database 420b. In some embodiments, the data processing system may store or archive, in the old CIDR/TTL range database 420b, information purged from the current CIDR/TTL range database 420a.

In operation 415, the data processing system initializes current CIDR/TTL ranges. For example, the data processing system may initialize a current CIDR/TTL range during operation 245. As another example, the data processing system may initialize a current CIDR/TTL range by removing the old information from the current CIDR/TTL range database 420a. In some embodiments, the data processing system may initialize a current CIDR/TTL range by ingesting or storing information in the current CIDR/TTL range database 420a. For example, the data processing system may initialize a current CIDR/TTL range responsive to completing the operation 250.

Figure 5:
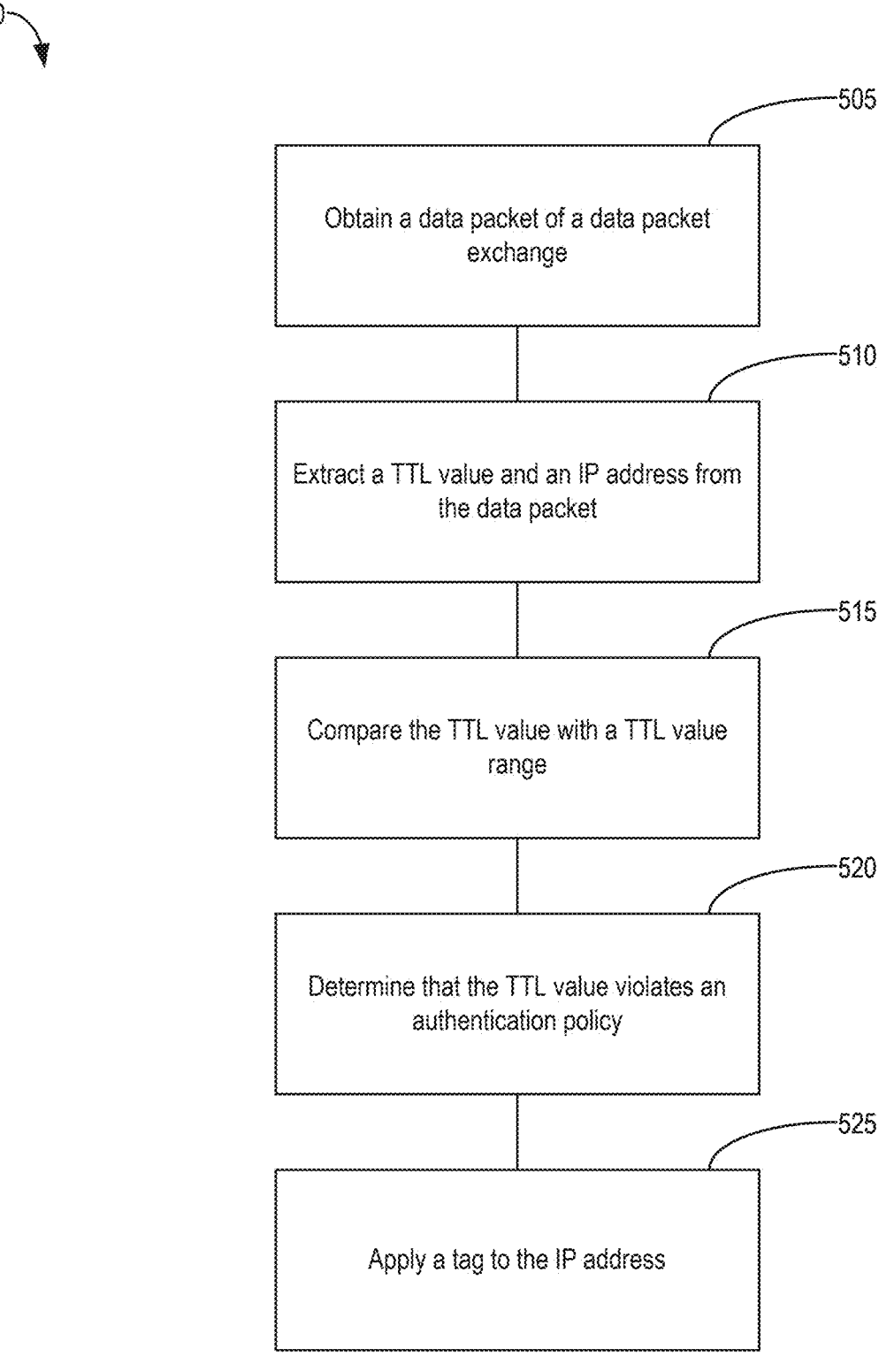
FIG. 5 is a method for spoofed network traffic detection, in accordance with an implementation.

FIG. 5 is a method 500 for spoofed network traffic detection, in accordance with an implementation. The method 500 can be performed by one or more system, component or module depicted in FIGS. 1 and/or 10A-10C, including, for example, a data processing system or service of a cloud service provider system. The method 500 may include more or fewer operations and the operations may be performed in any order. Performance of the method 500 may enable the data processing system to detect DDoS attacks based on spoofed network traffic.

At operation 505, the data processing system obtains a data packet of a data packet exchange. For example, the data processing system may obtain a data packet that corresponds to communication between the client device 106 and the service provider 108. As another example, the data processing system may obtain the data packet from the data collector 122. In some embodiments, the data processing system may continuously or semi-continuously obtain data packets. For example, the data collector 122 may forward or otherwise provide data packets to the data processing system as the data packets are obtained. As another example, the data collector 122 may transmit one or more data packets to the data processing system at one or more predetermined points in time.

At operation 510, the data processing system extracts a TTL value and an IP address from the data packet. For example, the data processing system may execute one or more data scraping techniques to extract the TTL value and the IP address included in the data packet exchange obtained in operation 505. In some embodiments, the data processing system may extract the TTL value and the IP address from the data packet by querying or searching the metric database 126. For example, the data collector 122 may store the TTL value and the IP address for each data packet exchange in the metric database 126.

At operation 515, the data processing system compares the TTL value with a TTL value range. For example, the data processing system may compare the TTL value, extracted in operation 510, with the TTL value ranges stored in the metric database 126. As another example, the data processing system may compare the TTL value with the TTL value ranges generated by the packet manager 124. In some embodiments, the data processing system may compare the TTL value with the TTL value range by traversing or searching the metric database 126 for one or more matches (e.g., a TTL value included in the TTL value range).

At operation 520, the data processing system determines that the TTL value violates an authentication policy. For example, the data processing system may determine that the TTL value, extracted in operation 510, is not absent from the TTL value range. Stated otherwise, the TTL value was not previously observed across a given network. In some embodiments, the data processing system may determine that the TTL value violates the authentication policy based on the TTL value exceeding a predetermined threshold. For example, the TTL value may exceed an average TTL value of the given network by a given value.

At operation 525, the data processing system applies a tag to the IP address. For example, the data processing system may apply a tag to the IP address, extracted in operation 510, responsive to the determination that the TTL value violates the authentication policy. In some embodiments, the data processing system may apply the tag to the IP address by updating or otherwise changing one or more flags in the metric database 126. For example, the data processing system may set a flag, in the metric database 126, to indicate that the IP address was tagged.

Figure 6:
FIG. 6 is an illustration of a flow diagram of a process for spoofed network traffic detection, in accordance with an implementation.
Figure 6:
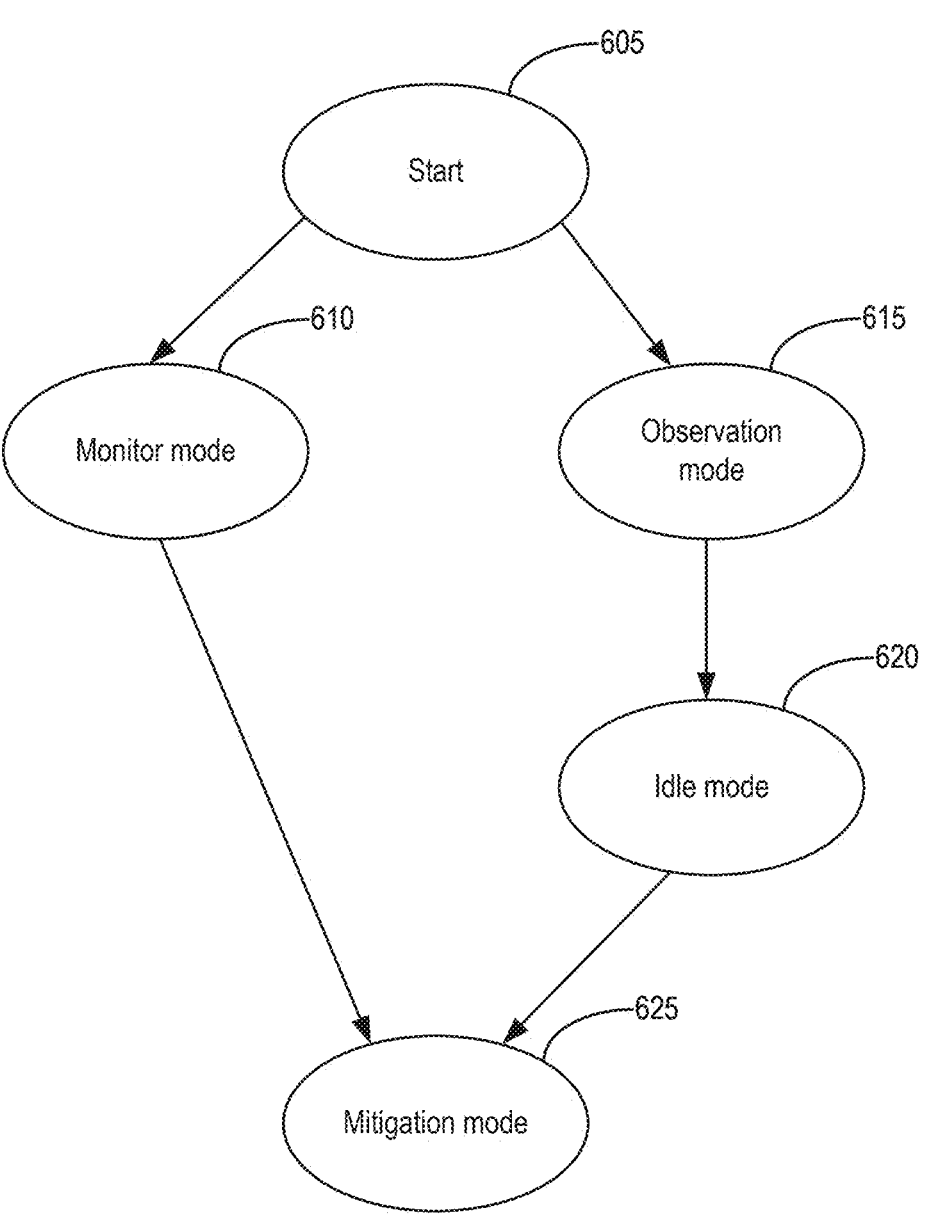

FIG. 6 is an illustration of a flow diagram of a process 600 for spoofed network traffic detection, in accordance with an implementation. The process 600 can be performed by a data processing system (the data processing system 110, shown and described with reference to FIG. 1). The process 600 may include more or fewer operations and the operations may be performed in any order. Performance of the process 600 may enable the data processing system to detect spoofed network traffic.

At operation 605, the process 600 starts. For example, at operation 605, the data processing system may begin to obtain data packets from the data collector 122. In some embodiments, the data processing system may remain in operation 605 for a given amount of time. The process 600 may proceed to operation 610 responsive to one or more signals. For example, the computing device 102 may transit one or more signals to indicate that the data processing system operate in a monitor mode. The process 600 may proceed to operation 615 responsive to one or more signals. For example, the data processing system may operate in an observation mode responsive to receipt of one or more signals from the computing device.

At operation 610, the data processing system operates in a monitor mode. For example, the data processing system may perform one or more operations of the process 200 during operation 610. As another example, the data processing system may extract TTL values from the data packet exchanges obtained in operation 605. In some embodiments, the data processing system may retrieve the TTL value ranges and/or the list of CIDR blocks from the metric database 126. For example, the data processing system may transmit one or more API calls to the metric database 126. In some embodiments, the data processing system may compare TTL values associated with the data packets with the TTL value ranges. The data processing system may compare IP addresses associated with the data packets with the list of CIDR blocks.

At operation 615, the data processing system operates in an observation mode. For example, the data processing system may perform one or more operations of the observation mode described herein. As another example, the data processing system observe the establishment phase of communications between the client devices 106 and the service providers 108.

At operation 620, the data processing system operates in an idle mode. For example, the data processing system may change from the observation mode to the idle mode responsive to a network characteristic satisfying a condition. While operating in the idle mode, the data processing system may prevent subsequent updating of the metric database 126. For example, the data processing system may halt any updating or storing of information in the metric database 126. As another example, the data processing system may no longer update the TTL value range.

At operation 625, the data processing system operates in a mitigation mode. For example, while operating in the mitigation mode, the data processing system may apply tags to data packets identified as malicious. The data processing system may apply to tags to data packets associated with TTL values that are absent from the TTL value ranges. In some embodiments, the data processing system may operate in the mitigation mode automatically (e.g., responsive to detecting an anomaly, such as responsive to a detection of differences between TTL values, extracted in operation 620, and the TTL value ranges) or manually (e.g., responsive to a user input).

Figure 7:
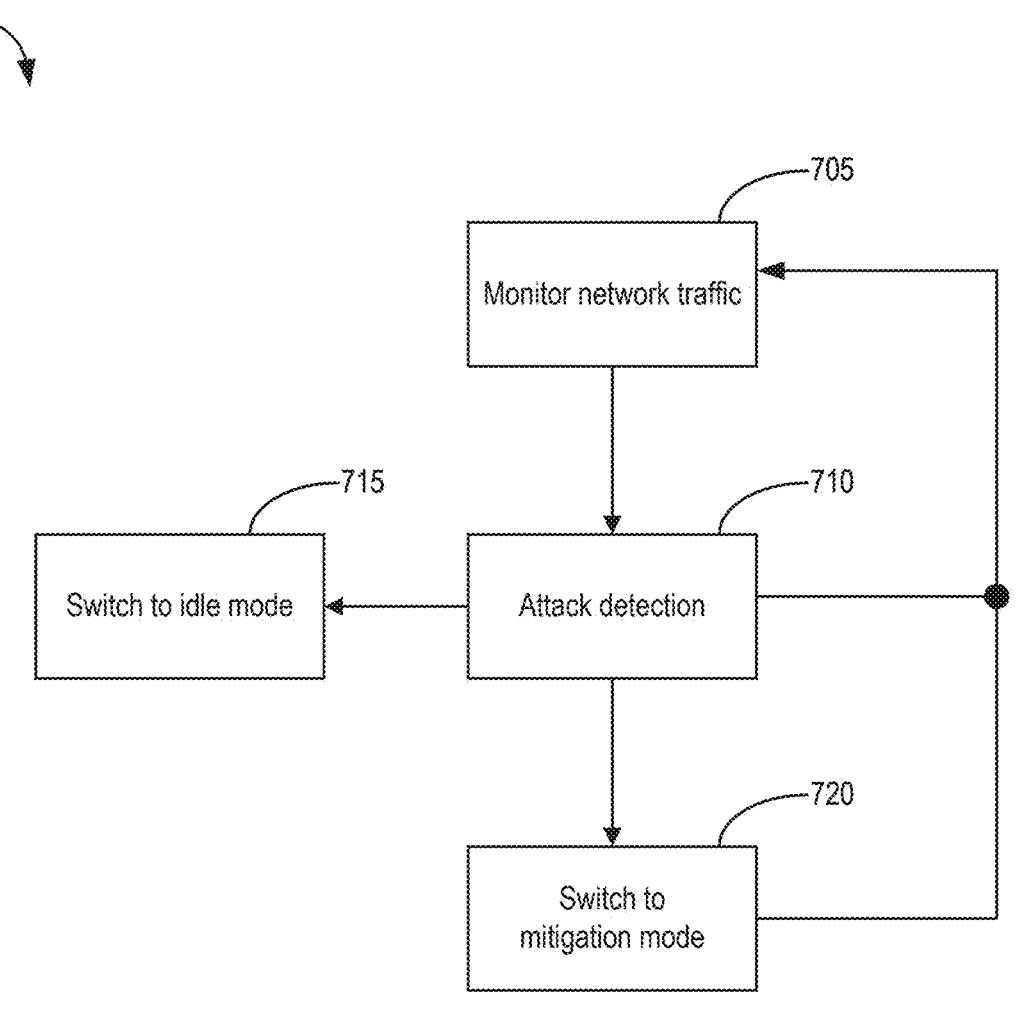
FIG. 7 is an illustration of a flow diagram of a process for spoofed network traffic detection, in accordance with an implementation.

FIG. 7 is an illustration of a flow diagram of a process 700 for spoofed network traffic detection, in accordance with an implementation. The process 700 can be performed by a data processing system (the data processing system 110, shown and described with reference to FIG. 1). The process 700 may include more or fewer operations and the operations may be performed in any order. Performance of the process 700 may enable the data processing system to detect spoofed network traffic.

At operation 705, the data processing system monitors network traffic. For example, the data processing system may monitor network traffic across the network 105. As another example, the data processing system may monitor network traffic by analyzing data packets provided by the data collector 122. In some embodiments, the data processing system may update the metric database 126 to reflect observed and/or extracted TTL values. For example, the data processing system may update the TTL value ranges based on information extracted from data packets. As another example, the data processing system may monitor IP addresses associated with the data packets analyzed in operation 705.

At operation 710, the data processing system detects an attack. For example, the data processing system may detect an attack on the network 105. In some embodiments, the data processing system may detect the attack responsive to determining that a data packet included a TTL value that was absent from the TTL value ranges. The data processing system may detect the attack responsive to determining that a data packet included an IP address that does not map to any CIDR block of the list of CIDR blocks associated with the network 105. In some embodiments, the data processing system may detect the attack responsive to receipt of one or more signals. In some embodiments, the data processing system may determine that one or more network characteristics satisfy a condition responsive to receipt of an indication of an attack. For example, the data processing system may receive one or more signals from the computing device 102 that indicate an attack on the network 105.

At operation 715, the data processing system switches to an idle mode. For example, the data processing system may switch to the idle mode responsive to detecting the attack in operation 710. For instance, the data processing system may switch to the idle mode when one or more of the following occur: a rate of unsuccessful session establishments goes above a threshold, a ratio of non-announced prefixes or private addresses goes beyond a threshold, and/or a sampled TCP authorization error rate goes beyond a threshold. In some embodiments, while operating in the idle mode, the data processing system may no longer update and/or refine the TTL value ranges. For example, while operating in the idle mode, the data processing may halt, stop, or restrict updating the metric database 126 to reflect observed TTL values. In doing so, the data processing system may avoid poisoning the database with inaccurate data generated during an attack.

In some embodiments, instead of or in addition to switching to the idle mode, the data processing system can switch to a mitigation mode. For example, at operation 720, the data processing system can switch to a mitigation mode responsive to detecting the attack in operation 710. In the mitigation mode, the data processing system can retrieve and/or otherwise access the TTL value ranges to compare against detected TTL values. The data processing system may determine that a detected TTL value is absent from the TTL value ranges (e.g., the detected TTL value is a previously undetected value) based on a comparison between the detected TTL value and the TTL value ranges. As another example, the data processing system may determine that a detect TTL value does not conform to and/or match one or more patterns indicated by the TTL value ranges.

In some embodiments, the process 700 may return to and/or repeat operation 705 responsive to the data process-ing system switching to a monitor mode. For example, the data processing system may switch to the monitor mode responsive to the data processing system no longer detecting an attack. As another example, the data processing system may switch to the monitor mode responsive to the data processing system operating in the mitigation mode for a given amount of time or responsive to a user input.

Figure 8:
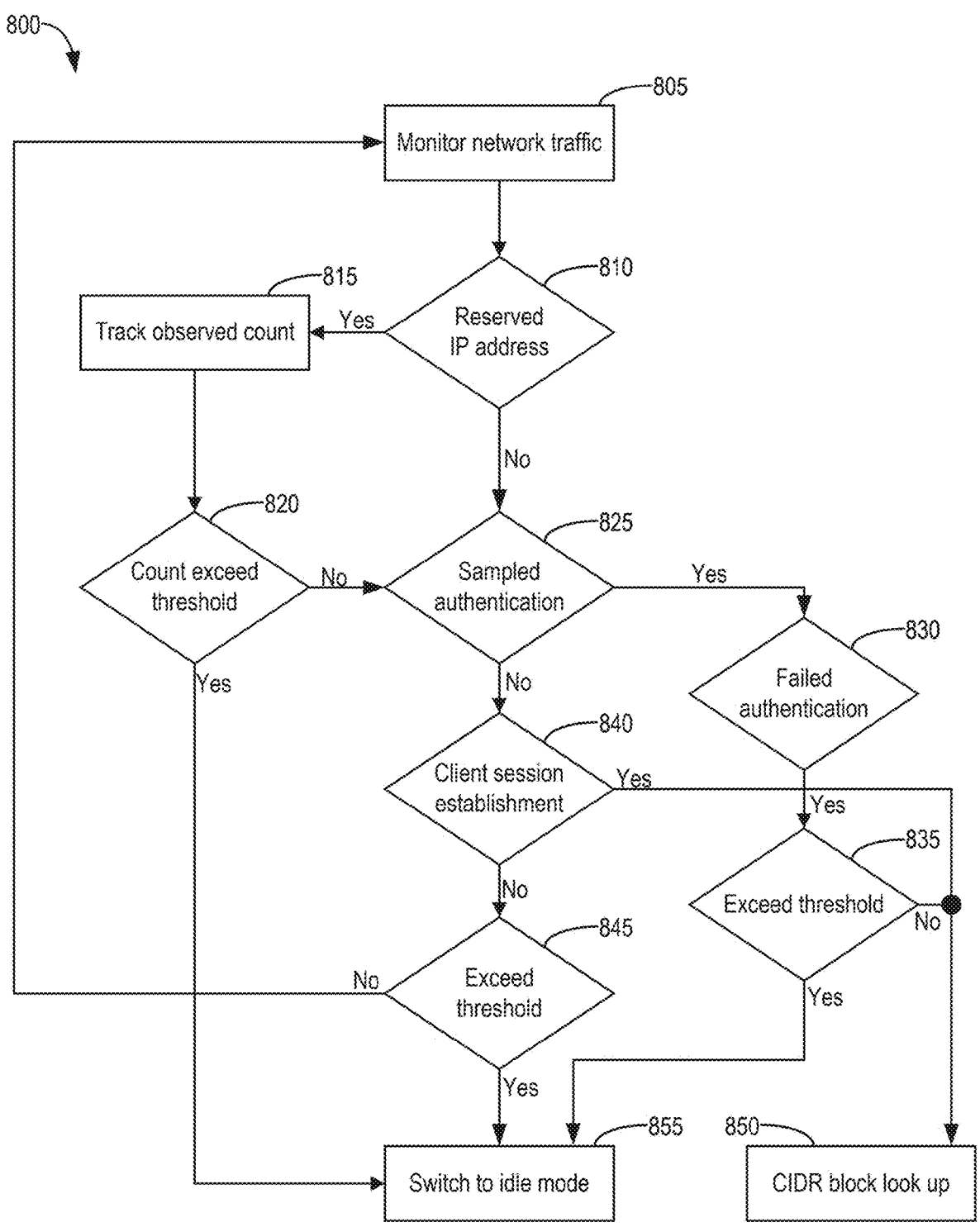
FIG. 8 is an illustration of a flow diagram of a process for spoofed network traffic detection, in accordance with an implementation.

FIG. 8 is an illustration of a flow diagram of a process 800 for spoofed network traffic detection, in accordance with an implementation. The process 800 can be performed by a data processing system (the data processing system 110, shown and described with reference to FIG. 1). The process 800 may include more or fewer operations and the operations may be performed in any order. Performance of the process 800 may enable the data processing system to detect spoofed network traffic.

At operation 805, the data processing system monitors network traffic. For example, the data processing system may monitor network traffic by extracting IP addresses from data packets transmitted across the network 105. As another example, the data processing system may monitor network traffic while operating in an observation mode. In some embodiments, the data processing system receives one or more data packets or data packet exchanges while operating in the observation mode. For example, the data processing system may receive data packets or information corresponding to the data packets while operating in the observation mode.

At operation 810, the data processing system determines whether the IP addresses correspond to reserved IP addresses. For example, the data processing system may compare the IP addresses, extracted in operation 805, with one or more reserved IP addresses for the network 105. As another example, the data processing system may compare the IP addresses with a list of non-allocated (e.g., reserved, unassigned, etc.) IP addresses. In some embodiments, the data processing system may compare the IP addresses with the one or more reserved IP addresses to check for matches. The process 800 proceeds to operation 815 responsive to a determination that one or more IP addresses correspond to reserved IP addresses. The process 800 proceeds to operation 825 responsive to a determine that one or more IP addresses do not correspond to reserved IP addresses.

At operation 815, the data processing system tracks observed counts. For example, the data processing system may update or increment a counter that indicates a number of occurrences that reserved IP addresses have detected. As another example, the data processing may update a data structure to reflect a number of instances that reserved IP addresses have been observed.

At operation 820, the data processing system determines whether a count exceeds a threshold. For example, the data processing may compare the count, tracked in operation 815, with a predetermined threshold. The data processing may compare the count with the predetermined threshold to determine when the threshold is exceeded. In some embodiments, the threshold may define a number of occurrences for which reserved IP addresses may be observed on the network 105. The process 800 proceeds to operation 855 responsive to a determination that the count exceeds the threshold. The process 800 proceeds to operation 825 responsive to a determination that the count does not exceed the threshold.

At operation 825, the data processing system determined whether to authenticate a sample. For example, the data processing system may select a number of session establishment packets that corresponds to 10% of a total number of session establishment packets observed in a given amount of time. As another example, the data processing system may select, at random, five session establishment packets from a collection of one hundred data packets. In some embodiments, the data processing system may select a given number of session establishment packets, received in operation 805, to authenticate. The process 800 may proceed to operation 830 for each session establishment packet selected for authentication. The process 800 may proceed to operation 840 for each session establishment packet not selected for authentication.

At operation 830, the data processing system determines if authentication failed. For example, the data processing system may implement TCP authentication to the selected session establishment packets. The data processing system may determine if authentication failed based on the results of the TCP authentication. In some embodiments, the data processing system may update or increment a counter responsive to a failed authentication. For example, the data processing system may update a data structure to represent a total number of session establishment packets that failed authentication.

At operation 835, the data processing system determines whether a threshold is exceeded. For example, the data processing system may determine if the counter associated with failed authentications exceeds a predetermined threshold. The process 800 may proceed to operation 850 responsive to a determination that the count does not exceed the threshold. The process 800 may proceed to operation 855 responsive to a determination that the count does exceed the threshold.

At operation 840, the data processing system determines whether a client session is established. For example, the data processing system may monitor TCP handshakes between the client devices 106 and the service providers 108 to determine when client sessions are established. As another example, the data processing system may monitor communication between the client devices 106 and the service providers 108 to determine if communication halts (e.g., session failures). In some embodiments, the data processing system may update a counter to represent a number of failed client session establishments. Stated otherwise, the data processing system may compare a number of successful TCP handshakes with a number of unsuccessful TCP handshakes. The process 800 may proceed to operation 850 for each successful client session establishment. The process 800 may proceed to operation 845 for each failed client session establishment.

At operation 845, the data processing system determines whether a threshold is exceeded. For example, the data processing system may determine if the counter associated with failed client session establishments exceeds a predetermined threshold. In some embodiments, the data processing system may determine a number of data packet exchanges obtain or received in operation 805. The data processing system may determine a number of data packet exchanges that failed the client session establishment. In some embodiments, the data processing system may detect one or more attacks based on a difference between the number of data packet exchanges received in operation 805 and the number of data packet exchanges that failed the client session establishment. The process 800 proceeds to operation 805 responsive to a determination that the threshold is not exceeded. The process 800 proceeds to operation 855 responsive to a determination that the threshold is exceeded.

At operation 850, the data processing system looks up a CIDR block. For example, the data processing system may retrieve a CIDR block from the metric database 126. As another example, the data processing system may retrieve a CIDR block of the list of CIDR blocks that is associated with the network 105. In some embodiments, the data processing system may compare the IP addresses, extracted in operation 805, with the IP addresses included in the CIDR block.

At operation 855, the data processing system switches to an idle mode. For example, the data processing system may stop updating the TTL value ranges while operating in the idle mode. As another example, the data processing system may switch from the observation mode to the idle mode responsive to detecting an attack on the network 105.

Figure 9:
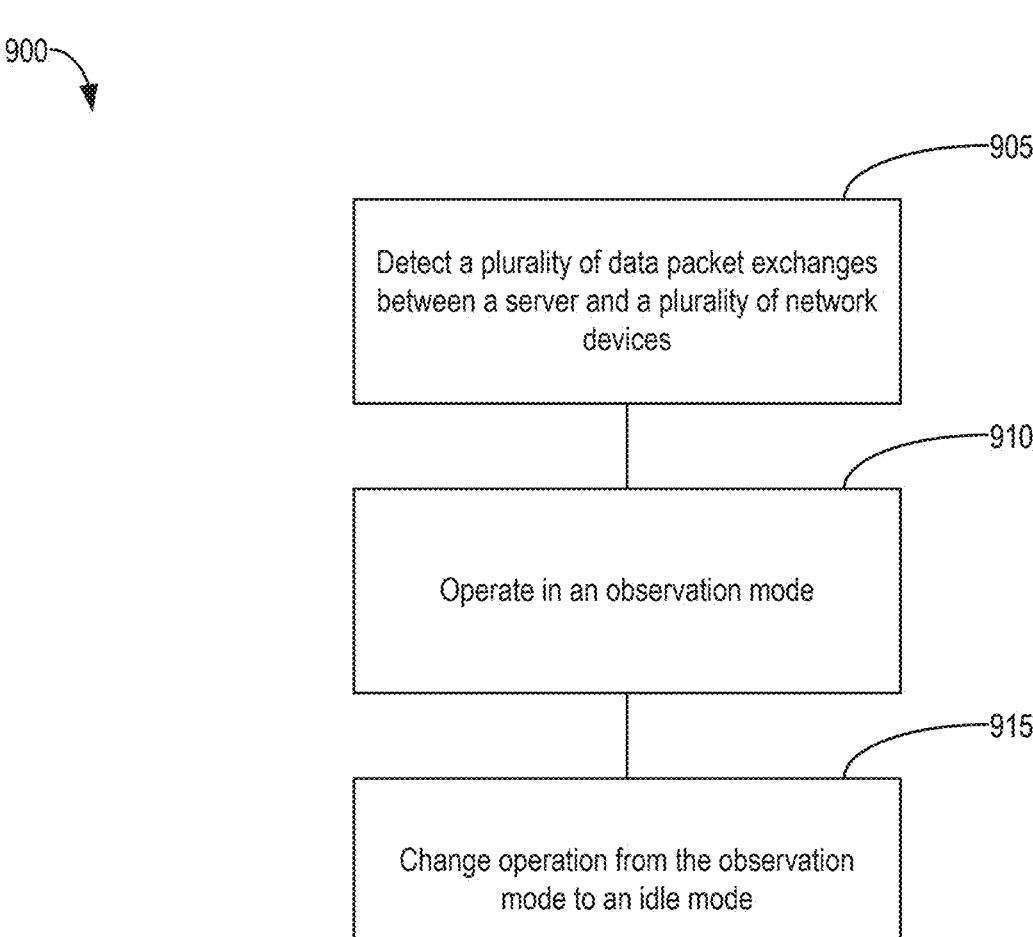
FIG. 9 is a method for spoofed network traffic detection, in accordance with an implementation.

FIG. 9 is a method 900 for spoofed network traffic detection, in accordance with an implementation. The method 900 can be performed by one or more system, component or module depicted in FIGS. 1 and/or 10A-10C, including, for example, a data processing system or service of a cloud service provider system. The method 900 may include more or fewer operations and the operations may be performed in any order. Performance of the method 900 may enable the data processing system to detect DDoS attacks based on spoofed network traffic.

At operation 905, the data processing system detects a plurality of data packet exchanges. The data packet exchanges can be between a server and a plurality of network devices. For example, the data packet exchanges can be between the client devices 106 and the service providers 108. In some embodiments, the data processing system may detect the data packet exchanges based on information collected by the data collector 122. For example, the data processing system may monitor information collected by the data collector 122 to detect the data packet exchanges.

At operation 910, the data processing system operates in an observation mode. For example, the data processing system may extract the TTL values from the data packet exchanges detected in operation 905. In some embodiments, the data processing system may aggregate or otherwise compile the TTL values. For example, the data processing system may add or update a cache to include the TTL values. In some embodiments, the data processing system may continuously or semi-continuously extract TTL values while operating in the observation mode.

In some embodiments, the data processing system may store information that represents the TTL value. For example, the data processing system may store the TTL values in a data structure. As another example, the data processing system may update the metric database 126 to reflect the extracted TTL values. In some embodiments, the data processing system may store the TTL values according to a list of CIDR blocks. For example, a TTL value may be linked or associated with a given CIDR block based on the given CIDR block including or being mapped to an IP address associated with the TTL value.

At operation 915, the data processing system switches from the observation mode to an idle mode. For example, the data processing system may switch to the idle mode responsive to a detection of an attack on the network 105. In some embodiments, the data processing system may prevent storage of information responsive to switching to the idle mode. For example, the data processing system may no longer update the data structure with information that represents TTL values while the data processing system is operating in the idle mode.

In a non-limiting example, the data processing system can use TTL values in combination with a mapping of IP addresses to CIDR blocks. The data processing system can do so using either pre-defined mapping to CIDR blocks (e.g., static /24 s or potentially /16 to /24 s) or by using a downloadable mapping database which uses current Internet routing information to map IP addresses to CIDR blocks. This mapping database can be downloaded from, for example, Routeviews, which can provide archives of MRT/RIB BGP data. The BGP data can then be converted to database of ASN/CIDR pairs. Alternatively, mapping database could be provided as a feed from NETSCOUT ASERT. This would make it possible to perform local queries of the ASN/CIDR database on Sightline/TMS and/or AED.

During either a monitoring mode or during an observation mode, the data processing system can build a database of CIDR+TTL values by, for example, taking the source IP address of clients and their respective TTL values. The clients'source IP addresses can be looked up in the ASN/CIDR database, resulting in a specific CIDR block. For example, the source IP 193.75.55.52 is part of CIDR block '193.75.0.0/17' which has been allocated to ASN 2116 (Globalconnect AS).

As client TTL values may start at 64, 128, or 255 based on the clients operating system, three groups of expected TTL values can be stored for each CIDR block seen. In some embodiments, the data processing system can build a statistical model of the TTL for each group. The statistical model can minimum, maximum, mean and standard deviation, which translates to the lower and upper bound, as well as the expected values and deviations to it. The statistical model can include a small amount of data and may be stored in memory, facilitating fast lookups and updates.

In the observation mode, one of the attack detection methods can elevate the mode from observation to idle mode, allowing for automated attack detection. Using observation mode will also stop the solution from updating the CIDR+TTL database with possibly spoofed values.

In mitigation mode, when a new client is attempting to connect to the services under protection, the data processing system can look up a client IP address in the CIDR+TTL database. If there is no match, the client IP address is treated as a suspicious IP address and will have to go through the TCP authentication process. If there is a match, the client's TTL value is matched against one of the 3 TTL groups, 1-63 would be matched against the '64' group, 63-127 would be matched against the '128' group and 128-255 would be matched against the '255' group. If the TTL value is not within an expected range (e.g., average plus or minus 2 times a standard deviation), it will be treated as suspicious and will have to go through the authentication process. If the client TTL value matches the expected range, it will bypass authentication all together.

During idle or mitigation modes, if no anomalies are detected for a while, it is possible to switch back to learning, either using monitor or observation mode depending on the implementation. This will allow for continued updates of the CIDR+TTL database with fresh, legitimate connection data.

Using CIDR blocks reduces the storage and tracking requirements and makes it easier to track expected CIDR ranges and their respective TTL values. Furthermore, an in-memory lookup provides a much smaller latency as opposed to TCP authentication. CIDR blocks are usually tied to GEO locations but can change over time so the CIDR+TTL database would have to be rebuilt on a regular basis.

Overall, by implementing the systems and methods described herein, a computer can reduce over-blocking that is presenting in existing anti-spoofing countermeasures, allowing traffic from known CIDR–TTL ranges to bypass authentication. By doing so, computing system can have countermeasures continuously enabled, which can minimize the time to mitigation. As long as the CIDR+TTL database is reinforced with new input, the data model can increasingly become better in covering almost all potential legitimate and regular connections.

Figure 10A:
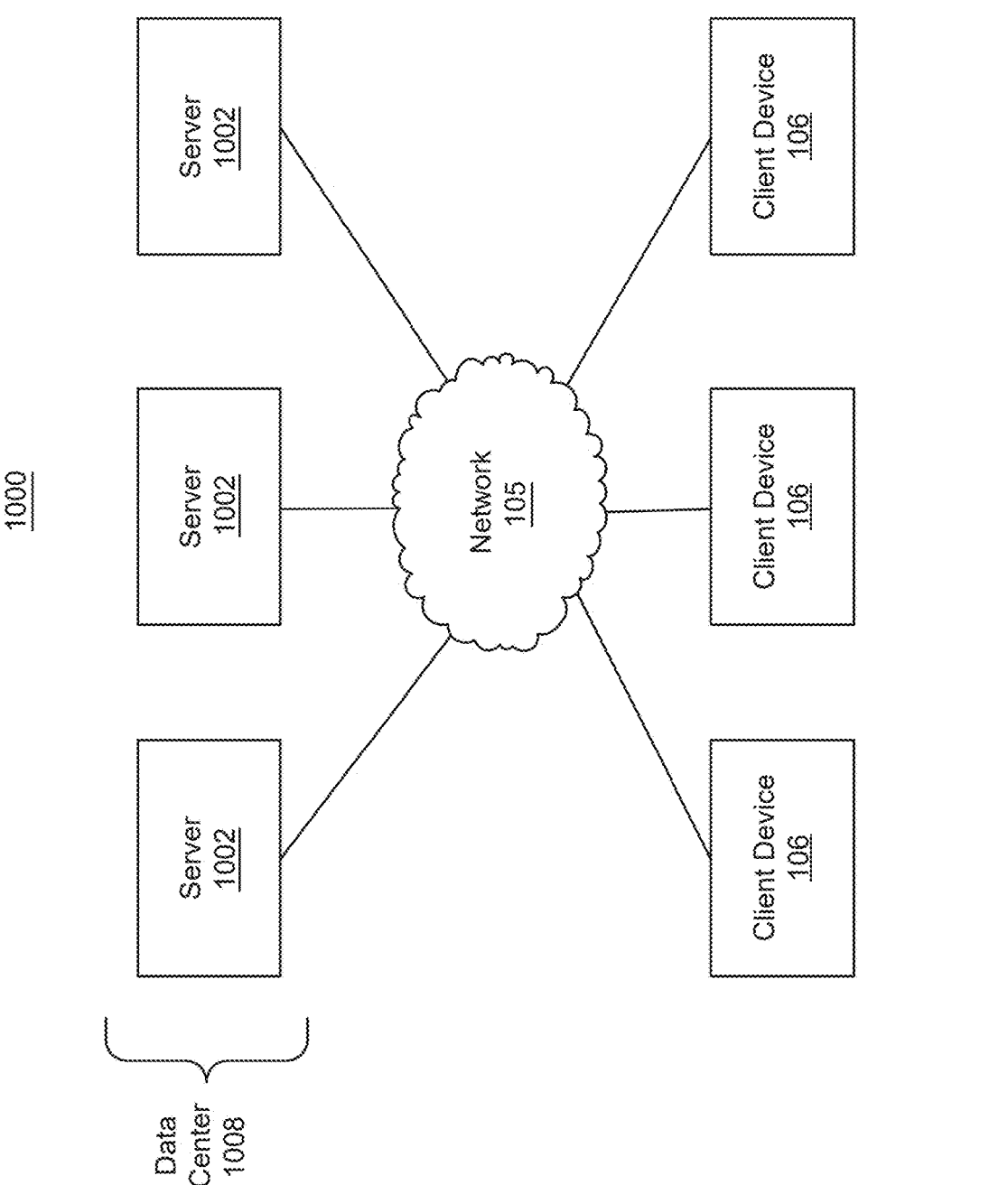
FIG. 10A is a block diagram depicting an implementation of a network environment including a client device in communication with a server device, in accordance with an implementation.

FIG. 10A depicts an example network environment that can be used in connection with the methods and systems described herein. In brief overview, the network environment 1000 includes one or more client devices 106 (also generally referred to as clients, client node, client machines, client computers, client computing devices, endpoints, or endpoint nodes) in communication with one or more servers 1002 (also generally referred to as servers, nodes, or remote machine) via one or more networks 105. In some embodiments, a client 106 has the capacity to function as both a client node seeking access to resources provided by a server and as a server providing access to hosted resources for other client devices 106.

Although FIG. 10A shows a network 105 between the client devices 106 and the servers 1002, the client devices 106 and the servers 1002 can be on the same network 105. In embodiments, there are multiple networks 105 between the client devices 106 and the servers 1002. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g., FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g., Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 1000 can include multiple, logically grouped servers 1002. The logical group of servers can be referred to as a data center 1008 (or server farm or machine farm). In embodiments, the servers 1002 can be geographically dispersed. The data center 1008 can be administered as a single entity or different entities. The data center 1008 can include multiple data centers 1008 that can be geographically dispersed. The servers 1002 within each data center 1008 can be homogeneous or heterogeneous (e.g., one or more of the servers 1002 or machines 1002 can operate according to one type of operating system platform (e.g., WINDOWS NT, manufactured by Microsoft Corp. of Redmond, Washington), while one or more of the other servers 1002 can operate on according to another type of operating system platform (e.g., Unix, Linux, or Mac OS X)). The servers 1002 of each data center 1008 do not need to be physically proximate to another server 1002 in the same machine farm 1008. Thus, the group of servers 1002 logically grouped as a data center 1008 can be interconnected using a network. Management of the data center 1008 can be de-centralized. For example, one or more servers 1002 can comprise components, subsystems, and modules to support one or more management services for the data center 1008.

Server 1002 can be a file server, application server, web server, proxy server, appliance, network appliance, gateway, gateway server, virtualization server, deployment server, SSL VPN server, or firewall. In embodiments, the server 1002 can be referred to as a remote machine or a node. Multiple nodes can be in the path between any two communicating servers.

Figure 10B:
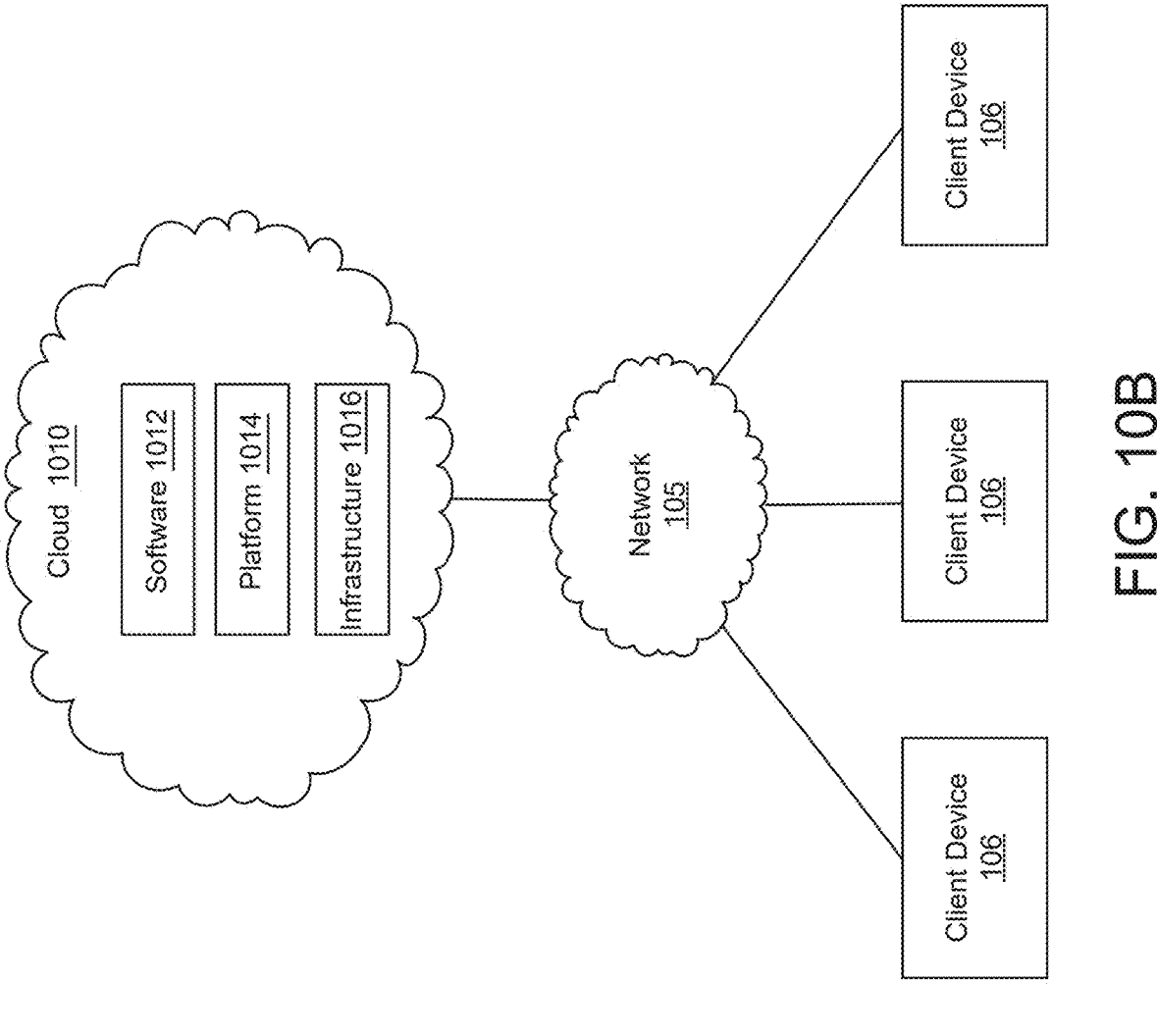
FIG. 10B is a block diagram depicting a cloud computing environment including a client device in communication with cloud service providers, in accordance with an implementation.

FIG. 10B illustrates an example cloud computing environment. A cloud computing environment 1001 can provide client 106 with one or more resources provided by a network environment. The cloud computing environment 1001 can include one or more client devices 106, in communication with the cloud 1010 over one or more networks 105. Client devices 106 can include, e.g., thick clients, thin clients, and zero clients. A thick client can provide at least some functionality even when disconnected from the cloud 1010 or servers 1002. A thin client or a zero client can depend on the connection to the cloud 1010 or server 1002 to provide functionality. A zero client can depend on the cloud 1010 or other networks 105 or servers 1002 to retrieve operating system data for the client device. The cloud 1010 can include back-end platforms, e.g., servers 1002, storage, server farms or data centers.

The cloud 1010 can be public, private, or hybrid. Public clouds can include public servers 1002 that are maintained by third parties to the client devices 106 or the owners of the clients. The servers 1002 can be located off-site in remote geographical locations as disclosed above or otherwise. Public clouds can be connected to the servers 1002 over a public network. Private clouds can include private servers 1002 that are physically maintained by client devices 106 or owners of clients. Private clouds can be connected to the servers 1002 over a private network 105. Hybrid clouds can include both the private and public networks 105 and servers 1002.

The cloud 1010 can also include a cloud-based delivery, e.g., Software as a Service (Saas) 1012, Platform as a Service (PaaS) 1014, and the Infrastructure as a Service (IaaS) 1016. IaaS can refer to a user renting the use of infrastructure resources that are needed during a specified time period. IaaS providers can offer storage, networking, servers, or virtualization resources from large pools, allowing the users to quickly scale up by accessing more resources as needed. PaaS providers can offer functionality provided by IaaS, including, e.g., storage, networking, servers, or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL), DTLS (Datagram Transport Layer Security), or other transmission mechanisms.

The client 106 and server 1002 can be deployed as and/or executed on any type and form of computing device, e.g., a computer, network device or appliance capable of communicating on any type and form of network and performing the operations described herein.

Figure 10C:
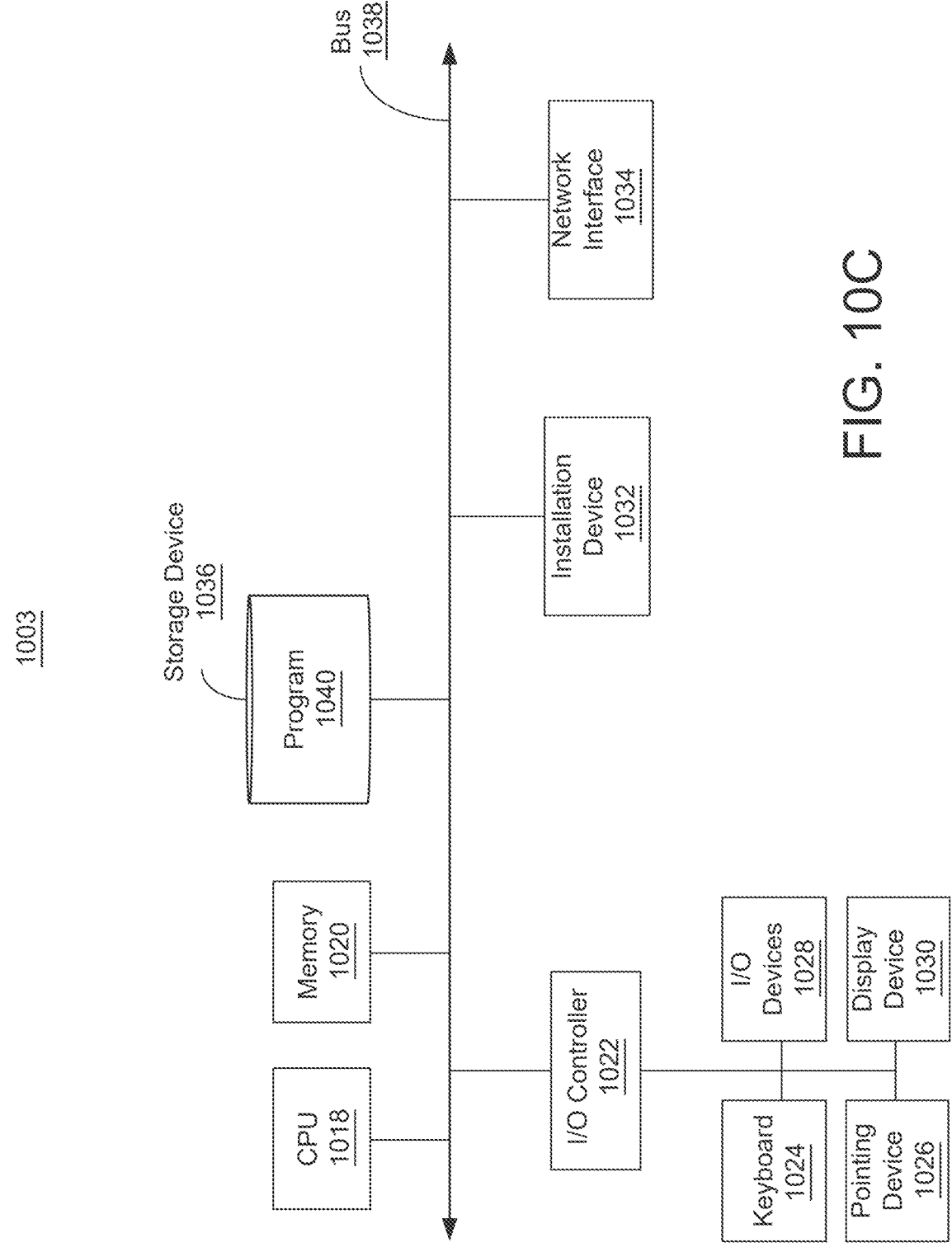
FIG. 10C is a block diagram depicting an implementation of a computing device that can be used in connection with the system depicted in FIG. 1, and the methods and processes depicted in FIGS. 2-9, in accordance with an implementation.

FIG. 10C depicts block diagrams of a computing device 1003 useful for practicing an embodiment of the client 106 or a server 1002. As shown in FIG. 10C, each computing device 1003 can include a central processing unit 1018, and a main memory unit 1020. As shown in FIG. 10C, a computing device 1003 can include one or more of a storage device 1036, an installation device 1032, a network interface 1034, an I/O controller 1022, a display device 1030, a keyboard 1024 or a pointing device 1026, e.g., a mouse. The storage device 1036 can include, without limitation, a program 1040, such as an operating system, software, or software associated with system 100.

The central processing unit 1018 is any logic circuitry that responds to and processes instructions fetched from the main memory unit 1020. The central processing unit 1018 can be provided by a microprocessor unit, e.g.: those manufactured by Intel Corporation of Mountain View, California. The computing device 1003 can be based on any of these processors, or any other processor capable of operating as described herein. The central processing unit 1018 can utilize instruction level parallelism, thread level parallelism, different levels of cache, and multi-core processors. A multi-core processor can include two or more processing units on a single computing component.

Main memory unit 1020 can include one or more memory chips capable of storing data and allowing any storage location to be directly accessed by the microprocessor 1018. Main memory unit 1020 can be volatile and faster than storage 1036 memory. Main memory units 1020 can be Dynamic random-access memory (DRAM) or any variants, including static random access memory (SRAM). The memory 1020 or the storage 1036 can be non-volatile; e.g., non-volatile read access memory (NVRAM). The memory 1020 can be based on any type of memory chip, or any other available memory chips. In the example depicted in FIG. 10C, the processor 1018 can communicate with memory 1020 via a system bus 1038.

A wide variety of I/O devices 1028 can be present in the computing device 1003. Input devices 1028 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 1028 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 1028, display devices 1030 or group of devices can be augmented reality devices. The I/O devices can be controlled by an I/O controller 1022 as shown in FIG. 10C. The I/O controller 1022 can control one or more I/O devices, such as, e.g., a keyboard 1024 and a pointing device 1026, e.g., a mouse or optical pen. Furthermore, an I/O device can also provide storage and/or an installation device 1032 for the computing device 1003. In embodiments, the computing device 1003 can provide USB connections (not shown) to receive handheld USB storage devices. In embodiments, an I/O device 1028 can be a bridge between the system bus 1038 and an external communication bus, e.g., a USB bus, a SCSI bus, a Fire Wire bus, an Ethernet bus, a Gigabit Ethernet bus, a Fiber Channel bus, or a Thunderbolt bus.

In embodiments, display devices 1030 can be connected to I/O controller 1022. Display devices can include, e.g., liquid crystal displays (LCD), electronic papers (e-ink) displays, flexile displays, light emitting diode displays (LED), or other types of displays. In some embodiments, display devices 1030 or the corresponding I/O controllers 1022 can be controlled through or have hardware support for OPENGL or DIRECTX API or other graphics libraries. Any of the I/O devices 1028 and/or the I/O controller 1022 can include any type and/or form of suitable hardware, software, or combination of hardware and software to support, enable or provide for the connection and use of one or more display devices 1030 by the computing device 1003. For example, the computing device 1003 can include any type and/or form of video adapter, video card, driver, and/or library to interface, communicate, connect, or otherwise use the display devices 1030. In embodiments, a video adapter can include multiple connectors to interface to multiple display devices 1030.

The computing device 1003 can include a storage device 1036 (e.g., one or more hard disk drives or redundant arrays of independent disks) for storing an operating system or other related software, and for storing application software programs 1040 such as any program related to the systems, methods, components, modules, elements, or functions depicted in FIG. 1. Examples of storage device 1036 include, e.g., hard disk drive (HDD); optical drive including CD drive, DVD drive, or BLU-RAY drive; solid-state drive (SSD); USB flash drive; or any other device suitable for storing data. Storage devices 1036 can include multiple volatile and non-volatile memories, including, e.g., solid state hybrid drives that combine hard disks with solid state cache. Storage devices 1036 can be non-volatile, mutable, or read-only. Storage devices 1036 can be internal and connect to the computing device 1003 via a bus 1038. Storage device 1036 can be external and connect to the computing device 1003 via an I/O device 1030 that provides an external bus. Storage device 1036 can connect to the computing device 1003 via the network interface 1034 over a network 105. Some client devices 106 may not require a non-volatile storage device 1036 and can be thin clients or zero client devices 106. Some storage devices 1036 can be used as an installation device 1032 and can be suitable for installing software and programs.

The computing device 1003 can include a network interface 1034 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 1003 can communicate with other computing devices 1002 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Florida. The network interface 1034 can include a built-in network adapter, network interface card, PCMCIA network card, EXPRESSCARD network card, card bus network adapter, wireless network adapter, USB network adapter, modem, or any other device suitable for interfacing the computing device 1003 to any type of network capable of communication and performing the operations described herein.

A computing device 1003 of the sort depicted in FIG. 10C can operate under the control of an operating system, which controls scheduling of tasks and access to system resources. The computing device 1003 can be running any operating system configured for any type of computing device, including, for example, a desktop operating system, a mobile device operating system, a tablet operating system, or a smartphone operating system.

The computing device 1003 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 1003 has sufficient processor power and memory capacity to perform the operations described herein. In some embodiments, the computing device 1003 can have different processors, operating systems, and input devices consistent with the device.

In embodiments, the status of one or more machines 106, 1003 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 1003 in response to the CPU 1018 executing an arrangement of instructions contained in main memory 1020. Such instructions can be read into main memory 1020 from another computer-readable medium, such as the storage device 1036. Execution of the arrangement of instructions contained in main memory 1020 causes the computing device 1003 to perform the illustrative processes described herein. One or more processors in a multi-processing arrangement may also be employed to execute the instructions contained in main memory 1020. Hard-wired circuitry can be used in place of or in combination with software instructions together with the systems and methods described herein. Systems and methods described herein are not limited to any specific combination of hardware circuitry and software.

Although an example computing system has been described in FIG. 10A, the subject matter including the operations described in this specification can be implemented in other types of digital electronic circuitry, or in computer software, firmware, or hardware, including the structures disclosed in this specification and their structural equivalents, or in combinations of one or more of them.

At least one aspect is directed to a system. The system can include a network monitoring device. The network monitoring device can be connected to a communications network. The network device can monitor network transmitted to and from a server across the communications network. The network monitoring device can include one or more processors coupled with memory. The memory can store instructions thereon. The instructions can cause, when executed by the one or more processors, the one or more processors to obtain a data packet of a data packet exchange between the server and a network device. The data packet can include an internet protocol (IP) address of the network device and a time to live (TTL) value. The instructions can cause the one or more processors to extract the TTL value and the IP address of the network device from the data packet. The instructions can cause the one or more processors to compare the TTL value with a TTL value range determined based on TTL values observed from data packets transmitted across the communications network. The instructions can cause the one or more processors to determine that the TTL value violates an authentication policy based on the TTL value being outside of the TTL value range. The instructions can cause the one or more processors to apply, based on the TTL value, a tag to the IP address of the network device in a database stored in the memory. The tag can identify the IP address of the network device as suspicious.

At least one aspect is directed to a method. The method can include obtaining, by one or more processing circuits, a data packet of a data packet exchange between a server and a network device via a communications network. The data packet can include an internet protocol (IP) address of the network device and a time to live (TTL) value. The method can include extracting, by the one or more processing circuits, the TTL value and the IP address of the network device from the data packet. The method can include comparing, by the one or more processing circuits, the TTL value with a TTL value range determined based on TTL values observed from data packets transmitted across the communications network. The method can include determining, by the one or more processing circuits, that the TTL value violates an authentication policy based on the TTL value being outside of the TTL value range. The method can include applying, by the one or more processing circuits, based on the TTL value, a tag to the IP address of the network device in a database stored in memory of the one or more processing circuits, the tag identifying the IP address of the network device as suspicious.

At least one aspect is directed to a non-transitory computer readable storage medium. The non-transitory computer readable storage medium can include instructions stored thereon. The instructions can cause, when executed by one or more processors, the one or more processors to obtain a data packet of a data packet exchange between the server and a network device via a communications network. The data packet can include an internet protocol (IP) address of the network device and a time to live (TTL) value. The instructions can cause the one or more processors to extract the TTL value and the IP address of the network device from the data packet. The instructions can cause the one or more processors to compare the TTL value with a TTL value range determined based on TTL values observed from data packets transmitted across the communications network. The instructions can cause the one or more processors to determine that the TTL value violates an authentication policy based on the TTL value being outside of the TTL value range. The instructions can cause the one or more processors to apply, based on the TTL value, a tag to the IP address of the network device in a database. The tag can identify the IP address of the network device as suspicious.

At least one aspect is directed to a system. The system can include a network monitoring device. The network monitoring device can be connected to a communications network. The network device can monitor network transmitted to and from a server across the communications network. The network monitoring device can include one or more processors coupled with memory. The memory can store instructions thereon. The instructions can cause, when executed by the one or more processors, the one or more processors to detect, based on the network traffic, a plurality of data packet exchanges between the server and a plurality of network devices. The plurality of data packet exchanges can represent establishments of communication sessions between the server and the plurality of network devices. While operating in an observation mode, the instructions can cause the one or more processors to extract, from first information associated with the plurality of data packet exchanges, a plurality of time to live (TTL) values that correspond to the plurality of data packet exchanges. While operating in an observation mode, the instructions can cause the one or more processors to store, responsive to extraction of the plurality of TTL values, second information that represents the plurality of TTL values in a data structure. The data structure can store the second information according to a Classless Inter-Domain Routing (CIDR) block that indicates a list of internet protocol (IP) addresses associated with the communications network. The instructions can cause the one or more processors to, responsive to a determination that a network characteristic of the monitored network traffic satisfies a condition, change operation from the observation mode to an idle mode in which the one or more processors prevent storage of information associated with subsequently established communication sessions.

At least one aspect is directed to a method. The method can include detecting, by one or more processing circuits, based on network traffic of a communications network, a plurality of data packet exchanges between a server and a plurality of network devices. The plurality of data packet exchanges can represent establishments of communication sessions between the server and the plurality of network devices. While operating in an observation mode, the method can include extracting, by the one or more processing circuits, from first information associated with the plurality of data packet exchanges, a plurality of time to live (TTL) values that correspond to the plurality of data packet exchanges. While operating in the observation mode, the method can include storing, by the one or more processing circuits, responsive to extraction of the plurality of TTL values, second information that represents the plurality of TTL values in a data structure. The data structure can store the second information according to a Classless Inter-Domain Routing (CIDR) block that indicates a list of internet protocol (IP) addresses associated with the communications network. The method can include, responsive to determining that a network characteristic of the monitored network traffic satisfies a condition, changing, by the one or more processing circuits, operation from the observation mode to an idle mode in which the one or more processors prevent storage of information associated with subsequently established communication sessions.

At least one aspect is directed to a non-transitory computer readable storage medium. The non-transitory computer readable storage medium can include instructions stored thereon. The instructions can cause, when executed by one or more processors, the one or more processors to detect, based on network traffic of a communications network, a plurality of data packet exchanges between a server and a plurality of network devices. The plurality of data packet exchanges can represent establishments of communication sessions between the server and the plurality of network devices. While operating in an observation mode, the instructions can cause the one or more processors to extract, from first information associated with the plurality of data packet exchanges, a plurality of time to live (TTL) values that correspond to the plurality of data packet exchanges. While operating in the observation mode, the instructions can cause the one or more processors to store, responsive to extraction of the plurality of TTL values, second information that represents the plurality of TTL values in a data structure. The data structure can store the second information according to a Classless Inter-Domain Routing (CIDR) block that indicates a list of internet protocol (IP) addresses associated with the communications network. The instructions can cause the one or more processors to, responsive to a determination that a network characteristic of the monitored network traffic satisfies a condition, change operation from the observation mode to an idle mode in which the one or more processors prevent storage of information associated with subsequently established communication sessions.

The foregoing detailed description includes illustrative examples of various aspects and embodiments and provides an overview or framework for understanding the nature and character of the claimed aspects and embodiments. The drawings provide illustration and a further understanding of the various aspects and embodiments and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file on a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all embodiments, and the described program components can be included in a single hardware or software product.

The phraseology and terminology used herein is for the purpose of description and should not be regarded as limiting. Any references to embodiments or elements or acts of the systems and methods herein referred to in the singular may also embrace embodiments including a plurality of these elements, and any references in plural to any implementation or element or act herein may also embrace embodiments including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system comprising:
a network monitoring device connected to a communications network, the network monitoring device configured to monitor network traffic transmitted to and from a server across the communications network, the network monitoring device comprising one or more processors coupled with memory, the memory storing executable instructions that, when executed by the one or more processors, cause the one or more processors to:
  obtain a data packet of a data packet exchange between the server and a network device, the data packet comprising an internet protocol (IP) address of the network device and a time to live (TTL) value;
  extract the TTL value and the IP address of the network device from the data packet;
  compare the TTL value with a TTL value range automatically generated during a time-constrained observation mode by monitoring a plurality of data packet exchanges representing successful communication sessions between the server and a plurality of network devices, extracting TTL values from the plurality of data packet exchanges, and generating the TTL value range based on the extracted TTL values, wherein the time-constrained observation mode operates for a predetermined time period or until a network characteristic satisfies a condition;
  determine that the TTL value is outside of the TTL value range;
  apply, based on the determination that the TTL value is outside of the TTL value range, a tag to the IP address of the network device in a database stored in the memory, the tag identifying the IP address of the network device as suspicious;
  execute, responsive to the application of the tag to the IP address, an authentication routine to evaluate the IP address; and
  block network traffic from the IP address based on the IP address failing the authentication routine.

2. The system of claim 1, wherein the instructions cause the one or more processors to:
  obtain a second data packet of a second data packet exchange between the server and a second network device, the second data packet comprising a second IP address of the second network device and a second TTL value;
  extract the second TTL value and the second IP address of the second network device from the second data packet;
  retrieve, from the database responsive to the extraction of the second IP address, a mapping that indicates a list of Classless Inter-Domain Routing (CIDR) blocks associated with the communications network;
  detect, based on the mapping, that the second IP address does not map to any CIDR block of the list of CIDR blocks associated with the communications network; and
  apply, responsive to the detection that the second IP address does not map to any CIDR block of the list of CIDR blocks associated with the communications network, a second tag to the second IP address in the database identifying the second IP address as suspicious.

3. The system of claim 1, wherein the instructions cause the one or more processors to:
  obtain a second data packet of a second data packet exchange between the server and a second network device, the second data packet comprising a second IP address of the second network device and a second TTL value;
  detect, based on a mapping between a Classless Inter-Domain Routing (CIDR) block associated with the communications network, that the second IP address is included in the CIDR block;
  responsive to the detection, compare the second TTL value with the TTL value range; and
  authenticate, based on a determination that the TTL value range includes the second TTL value, the second network device.

4. The system of claim 1, wherein the instructions cause the one or more processors to:
  obtain, from an external data source, a Classless Inter-Domain Routing (CIDR) block associated with the communications network;
  identify, responsive to obtaining the CIDR block, a mapping that indicates a list of IP addresses associated with the communications network;
  obtain a second data packet of a second data packet exchange between the server and a second network device, the second data packet comprising a second IP address of the second network device;
  determine that the second IP address is absent from the list of IP addresses; and apply, responsive to the detection that the second IP address is absent from the list of IP addresses associated with the communications network, a second tag to the second IP address in the database identifying the second IP address as suspicious.

5. The system of claim 1, wherein the instructions cause the one or more processors to:

monitor a plurality of data packet exchanges to extract a plurality of IP addresses and a plurality of TTL values from the plurality of data packet exchanges, the plurality of data packet exchanges between the server and a plurality of network devices, and the plurality IP addresses included in a list of Classless Inter-Domain Routing (CIDR) blocks associated with the communications network.

6. The system of claim 5, wherein the TTL value range indicates a difference between one or more first TTL values of the plurality of TTL values and one or more second TTL values of the plurality of TTL values.

7. The system of claim 1, wherein the instructions cause the one or more processors to:

extract, from a second data packet of a second data packet exchange between the server and a second network device, a second IP address of the second network device and a second TTL value determine, subsequent to the extraction of the second IP address of the second network device, that the second network device is an authenticated network device; and prevent, responsive to the determination that the second network device is the authenticated network device and responsive to extracting the second IP address from a third data packet of the second data packet exchange, a retrieval of a Classless Inter-Domain Routing (CIDR) block) that indicates a list of IP addresses associated with the communications network.

8. The system of claim 1, wherein the TTL value range is selected from a plurality of TTL value ranges, wherein each TTL value range of the plurality of TTL value ranges correspond to a different network device type, and wherein the instructions cause the one or more processors to:

compare the TTL value with the TTL value range based on the network device having a network device type that corresponds to the TTL value range.

9. A method, comprising:

obtaining, by one or more processing circuits, a data packet of a data packet exchange between a server and a network device via a communications network, the data packet comprising an internet protocol (IP) address of the network device and a time to live (TTL) value;

extracting, by the one or more processing circuits, the TTL value and the IP address of the network device from the data packet;

comparing, by the one or more processing circuits, the TTL value with a TTL value range automatically generated during a time-constrained observation mode by monitoring a plurality of data packet exchanges representing successful communication sessions between the server and a plurality of network devices, extracting TTL values from the plurality of data packet exchanges, and generating the TTL value range based on the extracted TTL values, wherein the time-constrained observation mode operates for a predetermined time period or until a network characteristic satisfies a condition;

determining, by the one or more processing circuits, that the TTL value is outside of the TTL value range;

applying, by the one or more processing circuits, based on the determination that the TTL value is outside of the TTL value range, a tag to the IP address of the network device in a database stored in memory of the one or more processing circuits, the tag identifying the IP address of the network device as suspicious;

executing, by the one or more processing circuits, responsive to the application of the tag to the IP address, an authentication routine to evaluate the IP address; and blocking, by the one or more processing circuits, network traffic from the IP address based on the IP address failing the authentication routine.

10. The method of claim 9, comprising:

obtaining, by the one or more processing circuits, a second data packet of a second data packet exchange between the server and a second network device, the second data packet comprising a second IP address of the second network device and a second TTL value;

extracting, by the one or more processing circuits, the second TTL value and the second IP address of the second network device from the second data packet;

retrieving, by the one or more processing circuits, from the database responsive to the extraction of the second IP address, a mapping that indicates a list of Classless Inter-Domain Routing (CIDR) blocks associated with the communications network;

detecting, by the one or more processing circuits, based on the mapping, that the second IP address does not map to any CIDR block of the list of CIDR blocks associated with the communications network; and applying, by the one or more processing circuits, responsive to the detection that the second IP address does not map to any CIDR block of the list of CIDR blocks associated with the communications network, a second tag to the second IP address in the database identifying the second IP address as suspicious.

11. The method of claim 9, comprising:

obtaining, by the one or more processing circuits, a second data packet of a second data packet exchange between the server and a second network device, the second data packet comprising a second IP address of the second network device and a second TTL value;

detecting, by the one or more processing circuits, based on a mapping between a Classless Inter-Domain Routing (CIDR) block associated with the communications network, that the second IP address is included in the CIDR block;

comparing, by the one or more processing circuits, the second TTL value with the TTL value range; and authenticate, subsequent to a determination that the TTL value range includes the second TTL value, the second network device.

12. The method of claim 9, comprising:

obtaining, by the one or more processing circuits, from an external data source, a Classless Inter-Domain Routing (CIDR) block associated with the communications network;

identifying, by the one or more processing circuits, responsive to obtaining the CIDR block, a mapping that indicates a list of IP addresses associated with the communications network;

obtaining, by the one or more processing circuits, a second data packet of a second data packet exchange between the server and a second network device, the second data packet comprising a second IP address of the second network device;

determining, by the one or more processing circuits, that the second IP address is absent from the list of IP addresses; and applying, by the one or more processing circuits, responsive to the detection that the second IP address is absent from the list of IP addresses associated with the communications network, a second tag to the second IP address in the database identifying the second IP address as suspicious.

13. The method of claim 9, comprising:

monitoring, by the one or more processing circuits, a plurality of data packet exchanges to extract a plurality of IP addresses and a plurality of TTL values from the plurality of data packet exchanges, the plurality of data packet exchanges between the server and a plurality of network devices, and the plurality IP addresses included in a list of Classless Inter-Domain Routing (CIDR) blocks associated with the communications network.

14. The method of claim 13, wherein the TTL value range indicates a difference between one or more first TTL values of the plurality of TTL values and one or more second TTL values of the plurality of TTL values.

15. The method of claim 9, comprising:

extracting, by the one or more processing circuits, from a second data packet of a second data packet exchange between the server and a second network device, a second IP address of the second network device and a second TTL value determining, by the one or more processing circuits, subsequent to the extraction of the second IP address of the second network device, that the second network device is an authenticated network device; and preventing, by the one or more processing circuits, responsive to the determination that the second network device is the authenticated network device, a retrieval of a Classless Inter-Domain Routing (CIDR) block that indicates a list of IP addresses associated with the communications network.

16. The method of claim 9, wherein the TTL value range is selected from a plurality of TTL value ranges, wherein each TTL value range of the plurality of TTL value ranges correspond to a different network device type, and comprising:

comparing, by the one or more processing circuits, the TTL value with the TTL value range based on the network device having a network device type that corresponds to the TTL value range.

17. A non-transitory computer readable storage medium comprising instructions stored thereon that, when executed by one or more processors, cause the one or more processors to:

obtain a data packet of a data packet exchange between the server and a network device via a communications network, the data packet comprising an internet protocol (IP) address of the network device and a time to live (TTL) value;

extract the TTL value and the IP address of the network device from the data packet;

compare the TTL value with a TTL value range automatically generated during a time-constrained observation mode by monitoring a plurality of data packet exchanges representing successful communication sessions between the server and a plurality of network devices, extracting TTL values from the plurality of data packet exchanges, and generating the TTL value range based on the extracted TTL values, wherein the time-constrained observation mode operates for a predetermined time period or until a network characteristic satisfies a condition;

determine that the TTL value is outside of the TTL value range;

apply, based on the determination that the TTL value is outside of the TTL value range, a tag to the IP address of the network device in a database, the tag identifying the IP address of the network device as suspicious;

execute, responsive to the application of the tag to the IP address, an authentication routine to evaluate the IP address; and block network traffic from the IP address based on the IP address failing the authentication routine.

18. The non-transitory computer readable storage medium of claim 17, wherein the instructions cause the one or more processors to obtain a second data packet of a second data packet exchange between the server and a second network device, the second data packet comprising a second IP address of the second network device and a second TTL value;

extract the second TTL value and the second IP address of the second network device from the second data packet;

retrieve, from the database responsive to the extraction of the second IP address, a mapping that indicates a list of Classless Inter-Domain Routing (CIDR) blocks associated with the communications network;

detect, based on the mapping, that the second IP address does not map to any CIDR block of the list of CIDR blocks associated with the communications network; and apply, responsive to the detection that the second IP address does not map to any CIDR block of the list of CIDR blocks associated with the communications network, a second tag to the second IP address in the database identifying the second IP address as suspicious.

\* \* \* \* \*